(12) United States Patent
Weldon

(10) Patent No.: US 9,727,085 B2
(45) Date of Patent: Aug. 8, 2017

(54) TABLET COMPUTER SYSTEM

(71) Applicant: INDUCOMP Corporation, Pacific, MO (US)

(72) Inventor: John T. Weldon, Pacific, MO (US)

(73) Assignee: INDUCOMP Corporation, Pacific, MO (US)

( * ) Notice: Subject to any disclaimer, the term of this patent is extended or adjusted under 35 U.S.C. 154(b) by 0 days.

(21) Appl. No.: 15/015,515

(22) Filed: Feb. 4, 2016

(65) Prior Publication Data
US 2016/0224065 A1 Aug. 4, 2016

Related U.S. Application Data

(60) Provisional application No. 62/112,145, filed on Feb. 4, 2015.

(51) Int. Cl.
*G06F 1/16* (2006.01)
*E05B 73/00* (2006.01)

(52) U.S. Cl.
CPC ........ *G06F 1/1632* (2013.01); *E05B 73/0082* (2013.01); *G06F 1/1626* (2013.01); *G06F 1/1684* (2013.01); *G06F 1/1686* (2013.01); *G06F 1/1688* (2013.01); *G06F 1/1696* (2013.01); *G06F 2200/1633* (2013.01)

(58) Field of Classification Search
CPC .... E05B 73/0082; E05B 73/00; G06F 1/1632; G06F 21/86–21/88
USPC .................................................. 361/679.41
See application file for complete search history.

(56) References Cited

U.S. PATENT DOCUMENTS

| 5,052,199 A | * | 10/1991 | Derman | ............... | E05B 73/0082 |
| | | | | | 70/19 |
| 5,162,976 A | * | 11/1992 | Moore | .................... | E05B 63/14 |
| | | | | | 361/679.58 |
| 5,595,074 A | * | 1/1997 | Munro | ................ | E05B 73/0082 |
| | | | | | 248/551 |

(Continued)

OTHER PUBLICATIONS http://www.pcworld.com/article/2153623/transform-a-windows-tablet-into-a-full-fledged-windows-pc.html; PC World, May 13, 2014, (14) pages.

(Continued)

*Primary Examiner* — Adrian S Wilson
(74) *Attorney, Agent, or Firm* — Senniger Powers LLP

(57) ABSTRACT

A system for use with a tablet computer includes a host electronic board configured to connect the tablet computer to a plurality of peripheral devices. An enclosure is configured to enclose the host electronic board and the tablet computer in an interior space of the enclosure. The enclosure includes a first part and a second part, which are moveable relative to one another between an open position for adding and removing the tablet computer from the enclosure and a closed position. The enclosure is configured so the interior space of the enclosure is substantially inaccessible from outside the enclosure in the closed position. The system includes a lock on the enclosure. The lock is configured to selectively convert from an unlocked configuration in which the first and second parts of the enclosure can be moved to the open position and a locked configuration in which the first and second parts of the enclosure cannot be non-destructively moved from the closed position to the open position.

16 Claims, 29 Drawing Sheets

(56) References Cited

U.S. PATENT DOCUMENTS

| | | | |
|---|---|---|---|
| 6,212,921 B1* | 4/2001 | Knighton | E05B 73/0082 248/551 |
| 6,497,125 B1* | 12/2002 | Necchi | E05B 73/0023 206/307 |
| 6,581,420 B1* | 6/2003 | Ling | E05B 73/0082 248/551 |
| 6,722,917 B2 | 4/2004 | Huang | |
| 7,255,228 B2* | 8/2007 | Kim | A45C 11/00 206/305 |
| 7,499,270 B2* | 3/2009 | Allen | E05B 73/0082 211/8 |
| 7,778,023 B1* | 8/2010 | Mohoney | G06F 1/1632 312/223.2 |
| 8,418,514 B1* | 4/2013 | Su | E05B 73/0005 70/14 |
| 8,814,128 B2* | 8/2014 | Trinh | A47F 7/024 248/187.1 |
| 8,869,573 B2* | 10/2014 | Myers | E05B 73/0005 70/14 |
| 8,885,337 B2* | 11/2014 | Schanz | B60R 11/0258 248/229.11 |
| 8,909,842 B2 | 12/2014 | Johnson | |
| 9,110,840 B2 | 8/2015 | Chow | |
| 9,163,433 B2* | 10/2015 | Sedon | E05B 73/0082 |
| 9,189,428 B2 | 11/2015 | Pollmann et al. | |
| 2003/0000857 A1* | 1/2003 | Jones | E05B 73/0082 206/320 |
| 2003/0137584 A1* | 7/2003 | Norvell | B60R 11/0235 348/61 |
| 2004/0233631 A1* | 11/2004 | Lord | F16M 13/00 361/679.41 |
| 2005/0154816 A1 | 7/2005 | Liu | |
| 2005/0247584 A1* | 11/2005 | Lu | A45F 5/00 206/320 |
| 2009/0009945 A1* | 1/2009 | Johnson | G06F 1/1613 361/679.27 |
| 2009/0294617 A1* | 12/2009 | Stacey | B60R 11/02 248/316.1 |
| 2011/0170257 A1* | 7/2011 | Allen | E05B 73/0082 361/679.57 |
| 2011/0297564 A1* | 12/2011 | Kim | A45C 11/00 206/320 |
| 2012/0033375 A1* | 2/2012 | Madonna | F16M 11/041 361/679.43 |
| 2012/0127651 A1* | 5/2012 | Kwon | G06F 21/88 361/679.43 |
| 2012/0234055 A1* | 9/2012 | Bland, III | E05B 73/0082 70/15 |
| 2012/0307448 A1* | 12/2012 | Allen | E05B 73/0082 361/679.57 |
| 2013/0107126 A1* | 5/2013 | Nonomura | G06F 1/1632 348/725 |
| 2013/0107445 A1* | 5/2013 | Reber | H04M 1/04 361/679.41 |
| 2014/0118930 A1* | 5/2014 | Sedon | E05B 73/0082 361/679.56 |
| 2014/0204529 A1* | 7/2014 | White | G06F 1/1675 361/679.55 |
| 2014/0328020 A1* | 11/2014 | Galant | F16M 11/105 361/679.56 |
| 2014/0362517 A1* | 12/2014 | Moock | E05B 73/0082 361/679.43 |

OTHER PUBLICATIONS https://manuals.info.apple.com/MANUALS/1000/MA1683/en_US/ipad_ios7_user_guide.pdf; iPad User Guide for iOS 7.1 Sortware, published Mar. 10, 2014, (140) pages.

USB Hub User Manual, 7-Port USB Hub for Raspberry Pi, Copyright © 2014, (11) pages.

* cited by examiner

FIG. 9
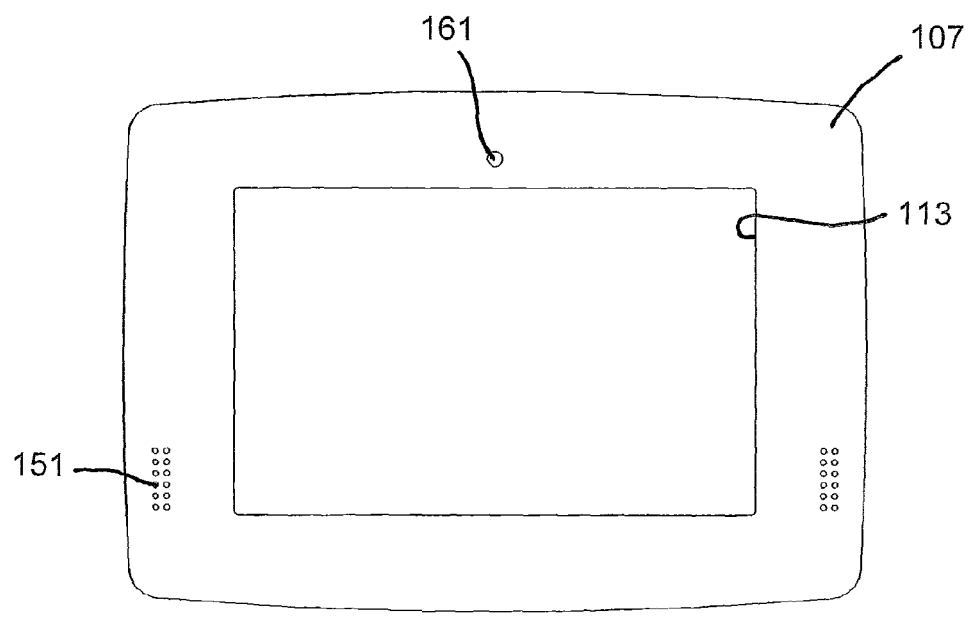
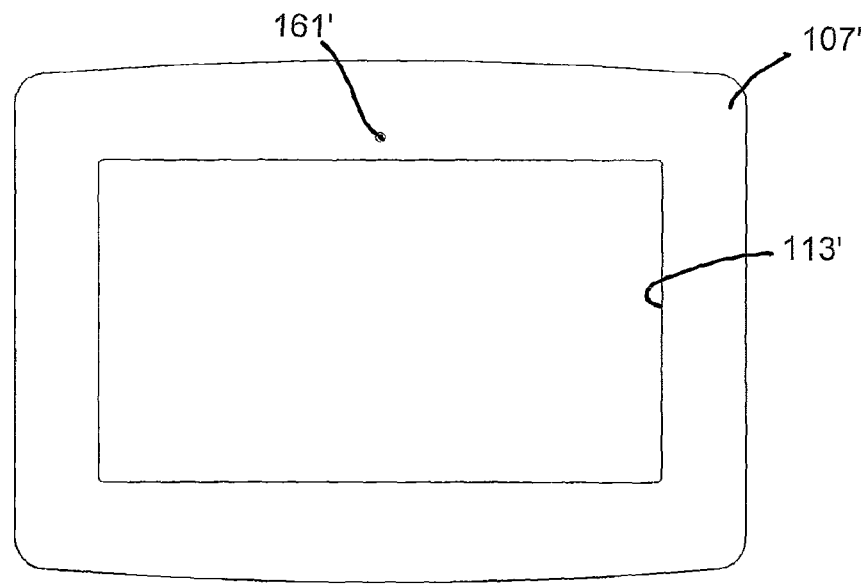

TABLET COMPUTER SYSTEM

FIELD OF INVENTION

This application is a Non-Provisional application, claiming priority to Provisional Application No. 62/112,145. filed Feb. 4, 2015. The entire contents of the above application are hereby incorporated by reference.

BACKGROUND

Tablet computers have become a very popular type of computing device. A typical tablet computer is a mobile device that has a generally flat, rectangular shape and a prominent touchscreen display (typically 7 inches or larger) that is a primary input/output device. Traditional keyboards are generally not used in a tablet computer. Instead tablet computers usually feature an on-screen pop up virtual keyboard that is sometimes used for typing. A stylus or finger is usually the most common mode of providing input to a tablet computer. Although an off-the-shelf tablet computer can have various different features, tablet computers typically come equipped with sensors for detecting motion and orientation, a camera, a speaker, and a microphone. Some examples of tablet computers include the Samsung Galaxy, Lenovo Yoga, Nvidia Shield, Google Nexus, Sony Xperia, Apple iPad, Toshiba Excite, Acer Iconia, Amazon Kindle, Barnes & Noble Nook, and many others. Tablet computers are very popular with consumers for activities such as Internet browsing, reading and sending emails, reading books, magazines, and other publications, playing games, taking, viewing, and editing pictures, and recording and watching videos. Many tablet computers are purchased and used primarily for personal recreation and entertainment.

However, as computing capabilities have increased, tablet computers have become more powerful and now have the processing capacity to perform many functions that have been traditionally conducted on more bulky and less portable computing devices, such as PCs. Nevertheless, the potential for expanded use of tablet computers in business and industry remains largely untapped.

The inventor has developed systems and methods described below that can facilitate broader usage of tablet computers, especially in applications of interest to business and industry.

SUMMARY

One aspect of the present invention is a system for use with a tablet computer. The system includes a host electronic board configured to connect the tablet computer to a plurality of peripheral devices and an enclosure configured to enclose the host electronic board and the tablet computer in an interior space of the enclosure. The enclosure has a first part and a second part. The first and second parts are moveable relative to one another between an open position for adding and removing the tablet computer from the enclosure and a closed position. The enclosure is configured so the interior space of the enclosure is substantially inaccessible from outside the enclosure in the closed position. The system has a lock on the enclosure. The lock is configured to selectively convert from an unlocked configuration in which the first and second parts of the enclosure can be moved to the open position and a locked configuration in which the first and second parts of the enclosure cannot be non-destructively moved from the closed position to the open position.

Other objects and features will be in part apparent and in part pointed out hereinafter.

BREIF DESCRIPTION OF THE DRAWINGS

FIG. 9 is a top plan of a set of interchangeable parts for enclosing different types of tablet computers within the enclosure of the system of FIG. 1;

FIGS. 26-29 are perspectives from three different vantage points of the lock, lock bar, and latch bar of FIGS. 25 and 26, illustrated in a locking configuration.

Corresponding reference numbers indicate corresponding parts throughout the drawings. Examples of applications for which tablet computers are currently underutilized include

DETAILED DESCRIPTION

Figure 1:
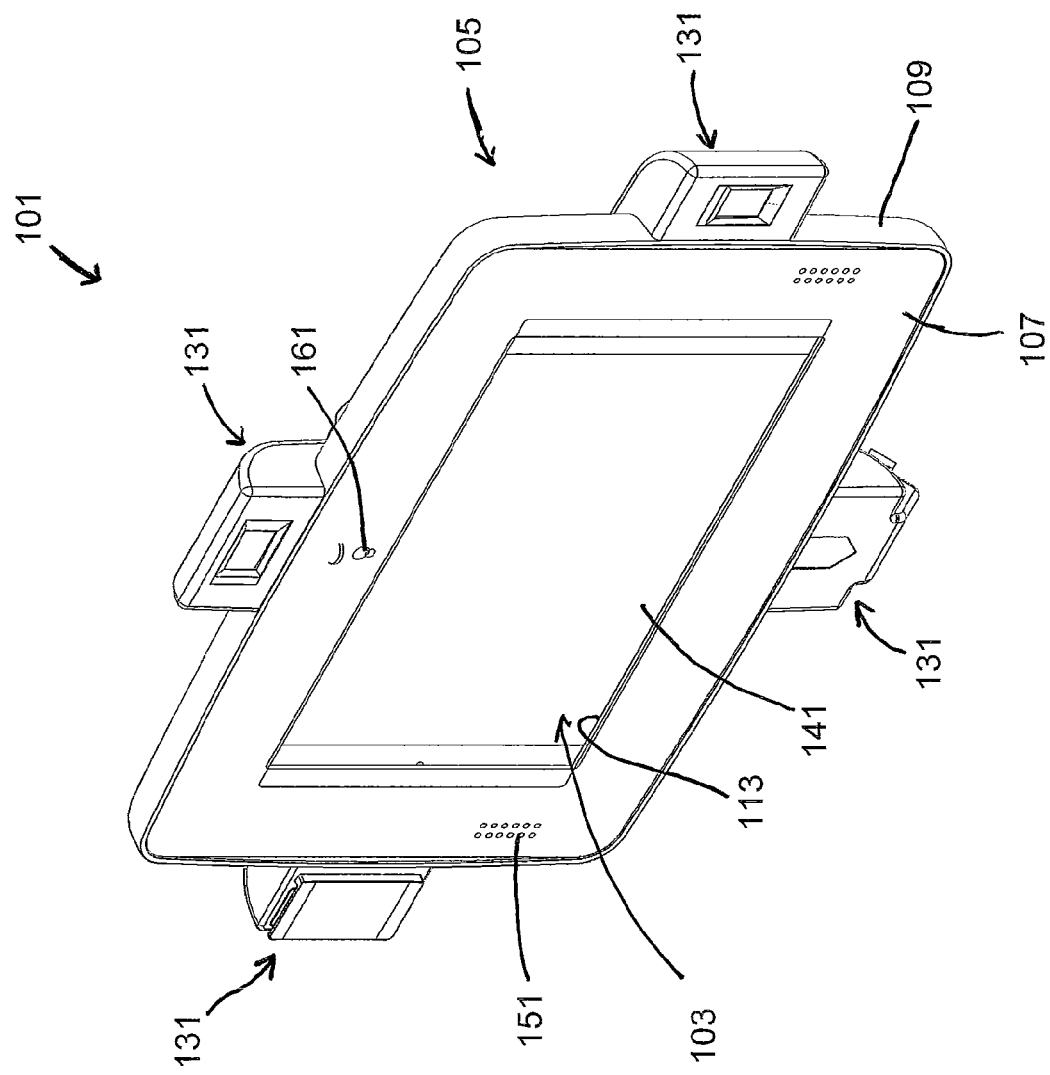
FIG. 1 is a perspective of one embodiment of a system of the present invention.

Referring now to the drawings, first to FIGS. 1-10, one embodiment of a system for use with a tablet computer 103 is generally designated 101. As illustrated, the system 101 includes an enclosure 105 and a host electronic board 115 (FIG. 10) configured to connect the tablet computer 103 to a plurality of peripheral devices 131. The peripheral devices 131 suitably include a number of devices that is greater than the number of devices that can connect directly to the tablet computer 103 (e.g., due to a limited number of connection ports on the tablet computer). The system 101 facilitates use of the tablet computer 103 in a wide range of applications including, without limitation, point-of-sale systems, inventory and price checks, electronic ordering, customer data capture, retail rewards program management, self-checkout, customer data capture, credit card sing-up, gift card kiosk, digital signage and marketing materials, digital menus and ordering for restaurants, hotel check-in and reservation, digital concierge, electronic message boards, employee time and attendance terminal, healthcare administration, digital medical charts, patient information kiosk, patient intake, patient self-triage, physical access, pharmaceutical tracking, and the like. The system 101 also provides great flexibility in the types of peripheral devices 131 that can be supported, which in turn provides great flexibility in the way the power of the tablet computer 103 is leveraged. The system also provides several other advantages which will become apparent from the details provided below.

The enclosure 105 is configured to enclose the host electronic board 115 and the tablet computer 103 in an interior space 111 of the enclosure. The enclosure 105 is suitably configured to hold the host electronic board 115 and tablet computer 103 in different parts of the interior 111 space of the enclosure. Although the tablet computer 103 may include one or more circuits, electronic boards, or other electronic components that performs one or more functions that can be performed by the host electronic board 115, the host electronic board is not part of the tablet computer. Instead the host electronic board 115 is a separate component that is connected, either wirelessly or by a wired connection, to the tablet computer 103, which is suitably an off-the-shelf tablet computer. The enclosure 105 is suitably adapted for connection of the enclosure, as well as the tablet computer 103 and host electronic board 115 therein, to a standard mounting interface, such as the VESA flat display mounting interface. This facilitates mounting the system 101 on a wall or pillar, desk or counter top support (e.g., a flexbible SWERVE mounting pole), a pole, a floor stand, a swivel stand, a flex pole, a vehicle or cart, and/or other objects that may be desired. The VESA mounting system is just one example of a suitable mounting system. Any mounting system suitable for positioning the touchscreen 141 of the tablet computer 103 at a desired position is suitable within the broad scope of the invention. It is also understood that mounting is optional and that the system 101 is suitable for use as a portable hand-held unit.

The configuration of the enclosure 103 can vary widely within the scope of the invention. As illustrated, the enclosure 103 includes a first part 107 and a second part 109 moveable relative to one another between an open position (FIG. 8) for adding and removing the tablet computer 103 from the enclosure and a closed position (FIGS. 1-7). The enclosure 103 is suitably configured so the interior space 111 of the enclosure is substantially inaccessible from outside the enclosure when the parts 107, 109 of the enclosure are in the closed position. For example, the first and second 107, 109 parts of the enclosure 103 are suitably configured so they mate with one another in a way that either leaves substantially no gaps between the parts of the enclosure or leaves substantially only gaps that are effectively plugged by other objects, such as by one or more of the peripheral devices 131.

As illustrated, the enclosure 105 includes a front plate 107 and a back 109. The front plate 107 has an opening 113 configured to be in registration with a touchscreen 141 of the tablet computer 103 when the tablet computer is in the enclosure 105. The front plate 107 is suitably selected from a set of interchangeable front plates. Referring to FIG. 9 two different versions of an enclosure front plate 107, 107' are illustrated side-by-side. The peripheral edge of each front plate 107, 107' is substantially identical in size and contour. Thus, the peripheral edge of the front plate can mate with the back 109 of the enclosure no matter which front plate 107, 107' is selected as the front plate of the enclosure 105. However, the openings 113, 113' of the two front plates 107, 107' have differing geometries that adapt the front plates for use with different types of tablet computers 103. In particular, the front plate 107' has a larger opening 113' and is for use with a tablet computer 103 having a larger touchscreen 141 while front plate 107 has a smaller opening 113 and is for use with a tablet computer having a smaller touchscreen. Moreover, front plate 107 has a plurality of openings 151 that are positioned to be in registration with a speaker and/or microphone on the tablet computer 103, while front plate 107' has no such openings because of the absence of speakers and microphones on the front of some other types of tablet computers. The front plates 107, 107' also have openings 161, 161' for a camera of the tablet computer that may be different in at least one of size and/or position to align the camera opening with a camera on the respective tablet computer 103. Other openings may be provided if desired (e.g., at geometric locations configured to be in registration with other sensors or components of the respective tablet computer 103) on any of the front plates. Also, although FIG. 9 illustrates only two different front plates 107, 107', it is understood that there can be many different configurations of interchangeable front plates in a set of front plates that can be used with a single configuration of back 109 to form the enclosure 105, with each front plate being configured differently for use with a tablet computer having different features and/or configurations (e.g., to cover or expose cameras, control buttons, etc.).

Figure 8:
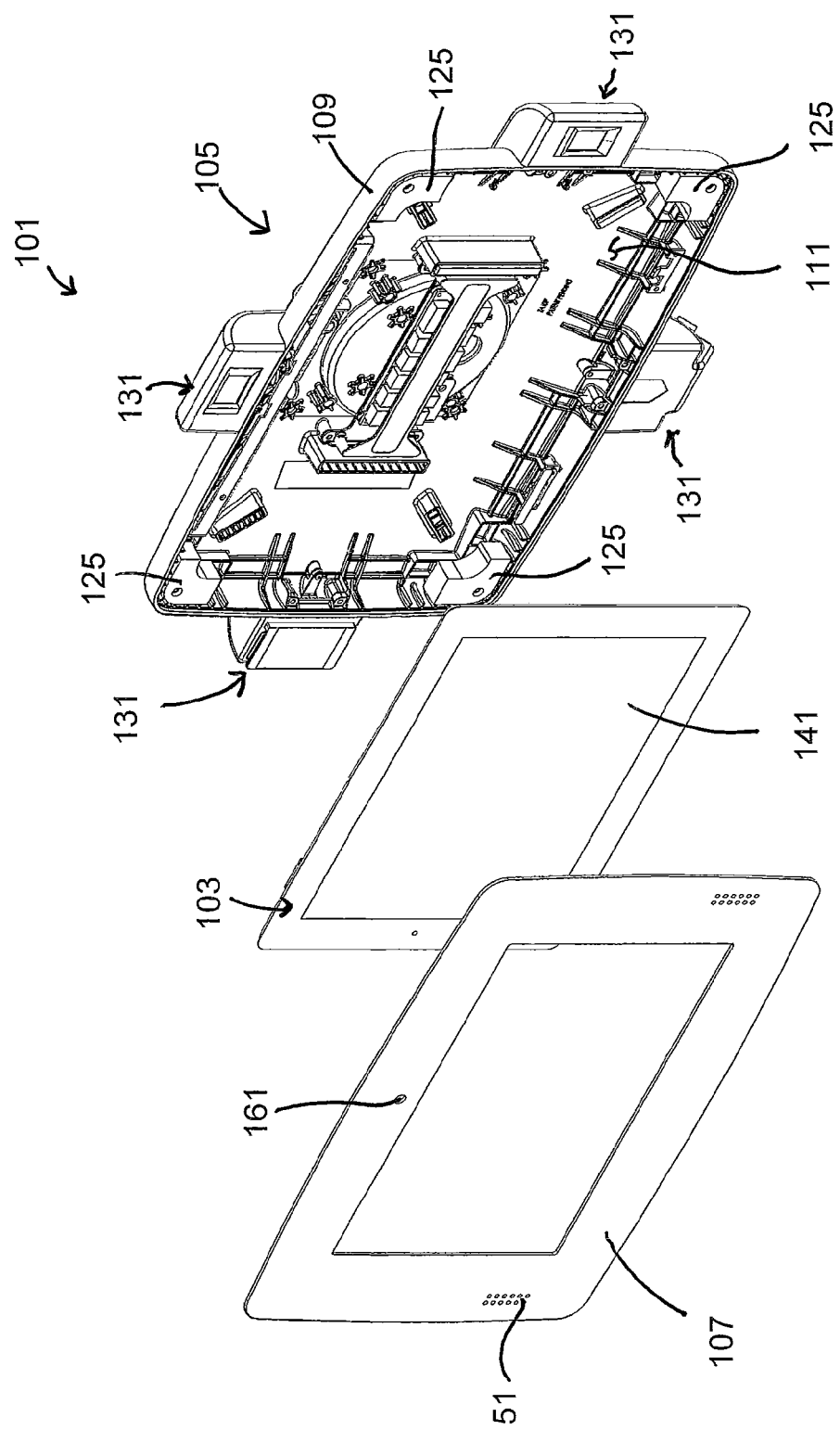
FIG. 8 is a perspective showing the system of FIG. 1 in a partially exploded state.

Referring to FIG. 8, the system suitably includes a set of foam cushions 125 configured to cushion the tablet computer 103 within the enclosure 105. The cushions 125 in FIG. 8 are configured to engage the tablet computer 103 and the enclosure 105 at their corners. The cushions 125 also provide the ability to accommodate tablet computers that are slightly different in size and/or shape. In some cases, a particular set of cushions 125 can have sufficient resiliency to allow for some variation in size and shape. It is also contemplated that multiple sets of cushions having different sizes and/or shape can be sold (or otherwise included) with the system 101 along with instructions advising users which set of cushions to use with particular tablet computers. Although there are four cushions 125 in the illustrated embodiment, the number of cushions can vary. It is also understood that foam is just one type of material that can be used to cushion the tablet computer 103. Other types of materials and other configurations can be used if desired.

Figure 10:
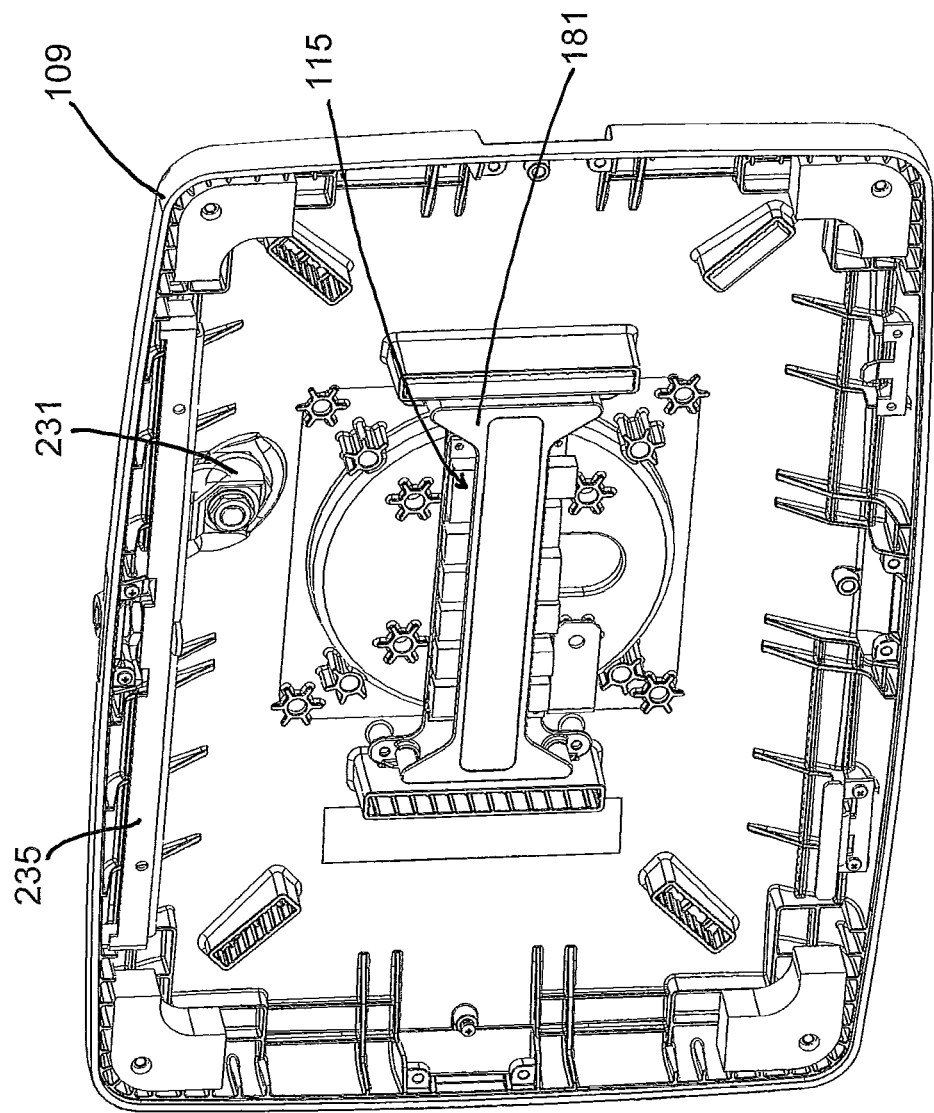
FIG. 10 is a perspective of the system with the front cover removed to show internal features.

As illustrated in FIG. 10, the back 109 of the enclosure 105 is suitably shaped to form a concave inner space behind the tablet computer 103 when the tablet computer is received within the peripheral edge of the back of the enclosure. The host electronic board 115 is secured (e.g., with screws or other suitable fasteners) to the back 109 of the enclosure 105 within this concave space. Although the embodiment illustrated in the drawings does not include any wiring, it is understood that the concave inner space in the back 109 of the enclosure 105 provides space for wiring various wired connections that may be desired. As illustrated, the host electronic board 115 is secured to the back 109 of the enclosure 105 at a position that is opposite the mount 121 (FIG. 3), which can facilitate connecting the host electronic board to external systems (e.g., building power supply, high-speed internet, etc.) using wiring extending through the mount if desired. Still referring to FIG. 10, the host electronic board is suitably protected by a shield 181 that extends over the host electronic board 115. The host electronic board 115 is suitably positioned between the shield 181 and the back 109 of the enclosure 105. When the tablet computer 103 is in the enclosure 105, the shield 181 is positioned between the host electronic board 115 and the back of the tablet computer 103. It may be desirable in some cases to include electromagnetic interference (EMI) shielding in the shield 181 to limit potential interference between the tablet computer 103 and the host electronic board 115.

Figure 11:
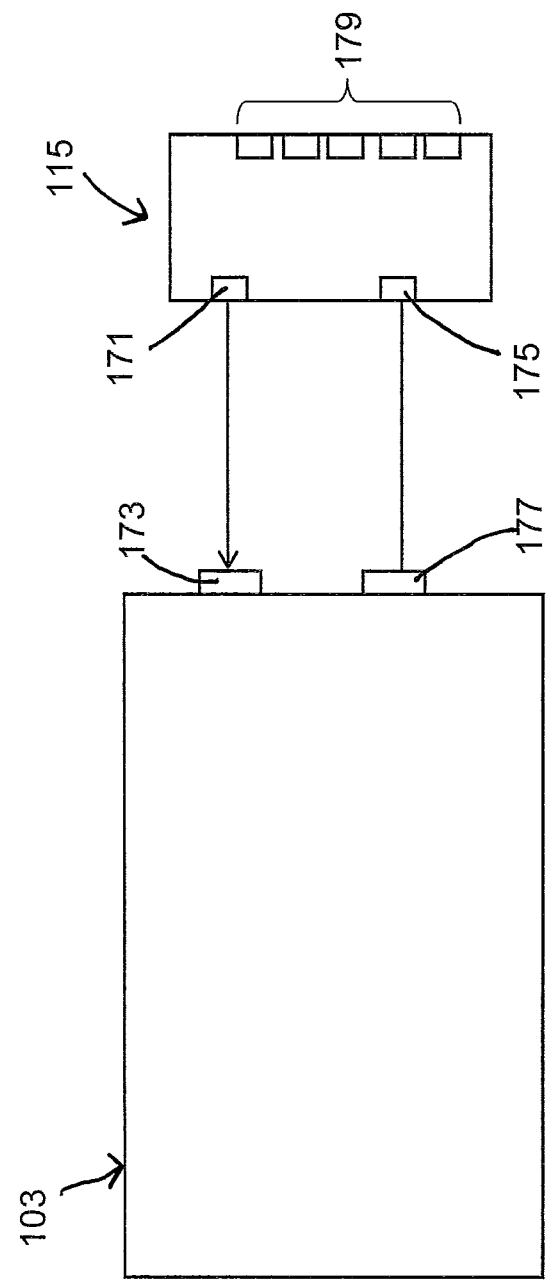
FIG. 11 is a schematic diagram of one embodiment of a host electronic board, illustrating one aspect thereof.
Figure 13:
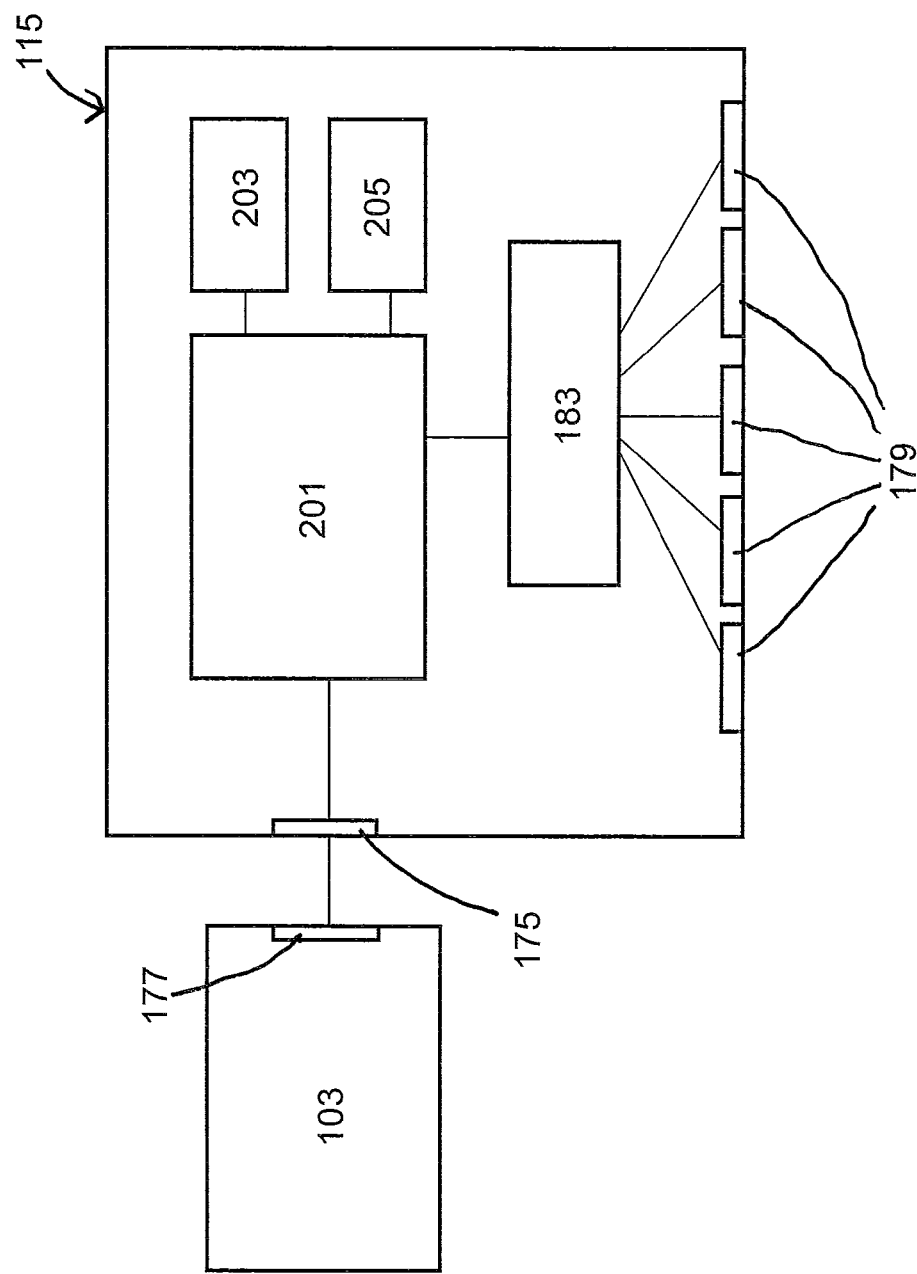
FIG. 13 is a third schematic diagram of the host electronic board, illustrating still another different aspect thereof.

In general, the host electronic board 115 is configured to expand capabilities of the tablet computer 103. There are various ways the host electronic board 115 can support expanded tablet computer functionality. For example, the host electronic board 115 is suitably configured to manage power supply for the peripheral devices 131. The host electronic board 115 is suitably also configured to manage all communications between the peripheral devices 131 and the tablet computer 103. The host electronic board 115 suitably also expands the capability of the tablet computer 103 to connect to multiple devices, including multiple peripheral devices 131 that use a limited number of ports on the table computer. As illustrated schematically in FIG. 11, for instance, the host electronic board 115 suitably has a plurality of USB expansion ports 179 (e.g., anywhere from 4-8 USB expansion ports) for connecting to the peripherals 131 and another USB port 175 for connecting to a USB port 177 on the tablet computer 103. Referring to FIG. 13, the USB ports 175, 179 on the host electronic board 115 are connected by a USB hub 183 to a smaller number of USB ports 177 on the tablet computer 103 to expand the number of USB connections to the tablet computer 103 that can be made. In FIG. 11, for instance, the host electronic board allows 4-8 USB connections between peripherals and a single USB port 177 on the tablet computer 103. If desired, the host electronic board 115 is configured to connect to at least some of the peripheral devices 131 wirelessly (e.g., using WiFi, Bluetooth, or the like). Alternatively or additionally, the host electronic board 115 is configured to connect to at least some of the peripheral devices 131 using a wired connection. In some cases, wire connections may be preferred, especially in retail environments or other public settings in which a large number of wireless signals are already present. In these circumstances, the ability to use one or more wired connections in the system 101 instead of wireless connection may be desirable to alleviate the problem of overcrowding the space with wireless signals.

Figure 12:
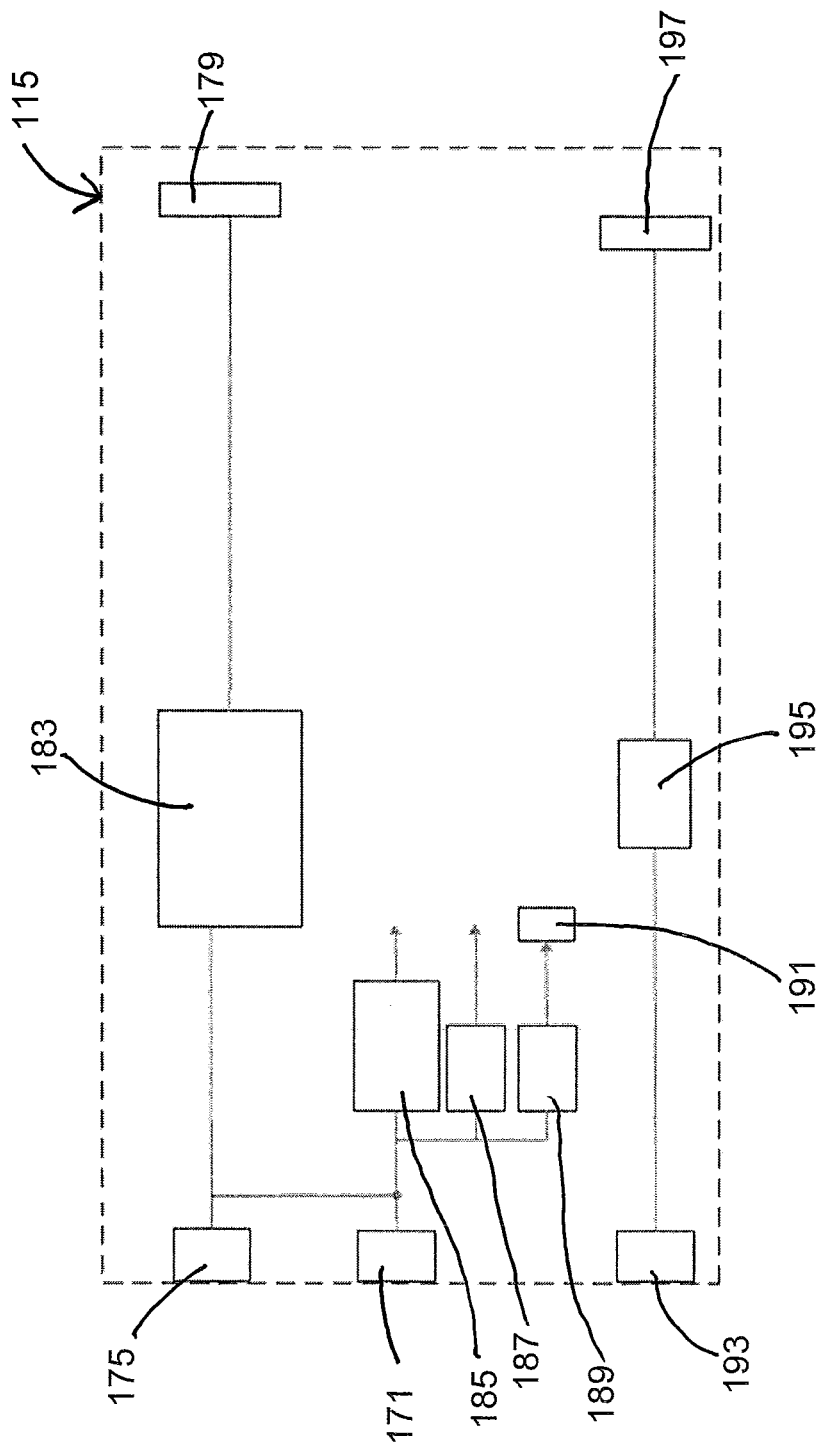
FIG. 12 is another schematic diagram of the host electronic board, illustrating a different aspect thereof.

The host electronic board 115 is also suitably configured to supply electrical power to the tablet computer 103. Various different tablet computers 103 use different types of strategies for charging the internal battery of the tablet computer. For example, some tablet computers 103 use separate charging jacks. The host electronic board 115 suitably has a DC output 191 configured for connection to a DC charging jack 173 on the tablet computer 103, as illustrated in FIGS. 11 and 12. FIG. 12 shows additional detail concerning one embodiment of a DC jack 171 on the host electronics board 115, including the schematic arrangement of the DC jack 171, a 5v buck boost converter 185, a 3v buck boost converter 187, a power switch 189, and a DC out header 191. The host electronic board 115 also suitably includes components for routing audio from the tablet computer through the host electronic board, which suitably include a speaker input 193 for connecting to a headphone jack on the tablet computer, speaker amplifier 195, and speaker header 197 for providing audio output from the system 101.

While some tablet computers 103 use a separate charging jack, other tablet computers do not have a separate charging jack and instead use a Micro USB connection for charging and also for data communications. Because standard USB is limited to only 500 mA, tablet computers that use USB for charging use various techniques to support the high current associated with battery charging. For example, some tablet computers 103 use resistor settings on the ID or data line to handle switches between data communication and charging functions. Other tablet computers 103 use the USB Batter Charging Specification (ACA). Still other tablet computers use a proprietary protocol for managing the switch to high power charging (e.g., Apple iOS). The host electronic board 115 is suitably configured to support multiple different charging techniques to facilitate use of the same host electronic board 115 with a variety of different tablet computers. For example, the host electronic board 115 is suitably configured to charge the tablet computers 103 through a separate charging jack 191 (for use when the system 101 is used with a tablet computer 103 that has a separate charging jack) and also configured to charge the tablet computer using a USB 175 or other connection that is used for charging and data communication (for use when the system 101 is used with a tablet computer 103 that is designed to be charged through a USB or other data communication port). Moreover, the host electronic board 115 is also suitably configured to charge the tablet computer 103 though a dual use charging/data communication port using more than one technique to support high current charging, including without limitation, using a change in a resistor setting to switch from charging to communication, using the USB Battery Charging Specification (ACA), and/or using one or more proprietary protocols for managing the switch from low power communication to high power charging (e.g., Apple iOS).

The host electronic board 115 is suitably configured to charge the tablet computer 103 while simultaneously supporting operation of the peripheral devices 131. In the case of a tablet computer 103 that uses a separate charging jack 173, there is no need to manage switching between the charging function and the communication function. However, the host electronic board 115 is suitably configured to charge the tablet computer 103 while concurrently running the peripheral devices 131 when the same port 177 on the tablet computer is used for charging and for communication. One embodiment of a host electronic board 115 that is configured to multiplex multiple peripheral devices 131 and perform the tablet charging through a single MicroB USB connection, is illustrated schematically in FIG. 13.

The peripherals 131 are attached through the USB ports 179 and USB hub 183 to a microcontroller 201. The USB port 177 on the tablet computer 103 is connected to the USB port 175 on the host electronic board, which is also connected to the microcontroller 201. The microcontroller 201 manages the multiplexing required to operate all of the peripheral devices 131 at the same time. API software (e.g., in the form of an "App") can be installed on the tablet computer 103 to facilitate communication with the microprocessor 201 by distinguishing data from the various different peripheral devices 131 and make that data available for use on the tablet computer. The multiplexing microcontroller 201 of the host electronic board 115 and the API software running on the tablet computer 103 can be used to run multiple peripheral devices 131 on any tablet computer that has a single USB or other connection port (such as typical Apple iPad computers) or whenever the number of connection ports on the tablet computer is less than the number of peripheral devices. The microprocessor 201 is also configured to manage switching between charging and data communication. The host electronic board 115 suitably can have a co-processor 205 (e.g., an Apple authentication co-processor) and a flash RAM memory 203 connected to the microprocessor 201, as illustrated in FIG. 13 for example.

The host electronic board 115 can include all of the features described above simultaneously, or any combination thereof. The host electronic board 115 can also be configured to provide additional or different capabilities without departing from the scope of the invention.

Figure 2:
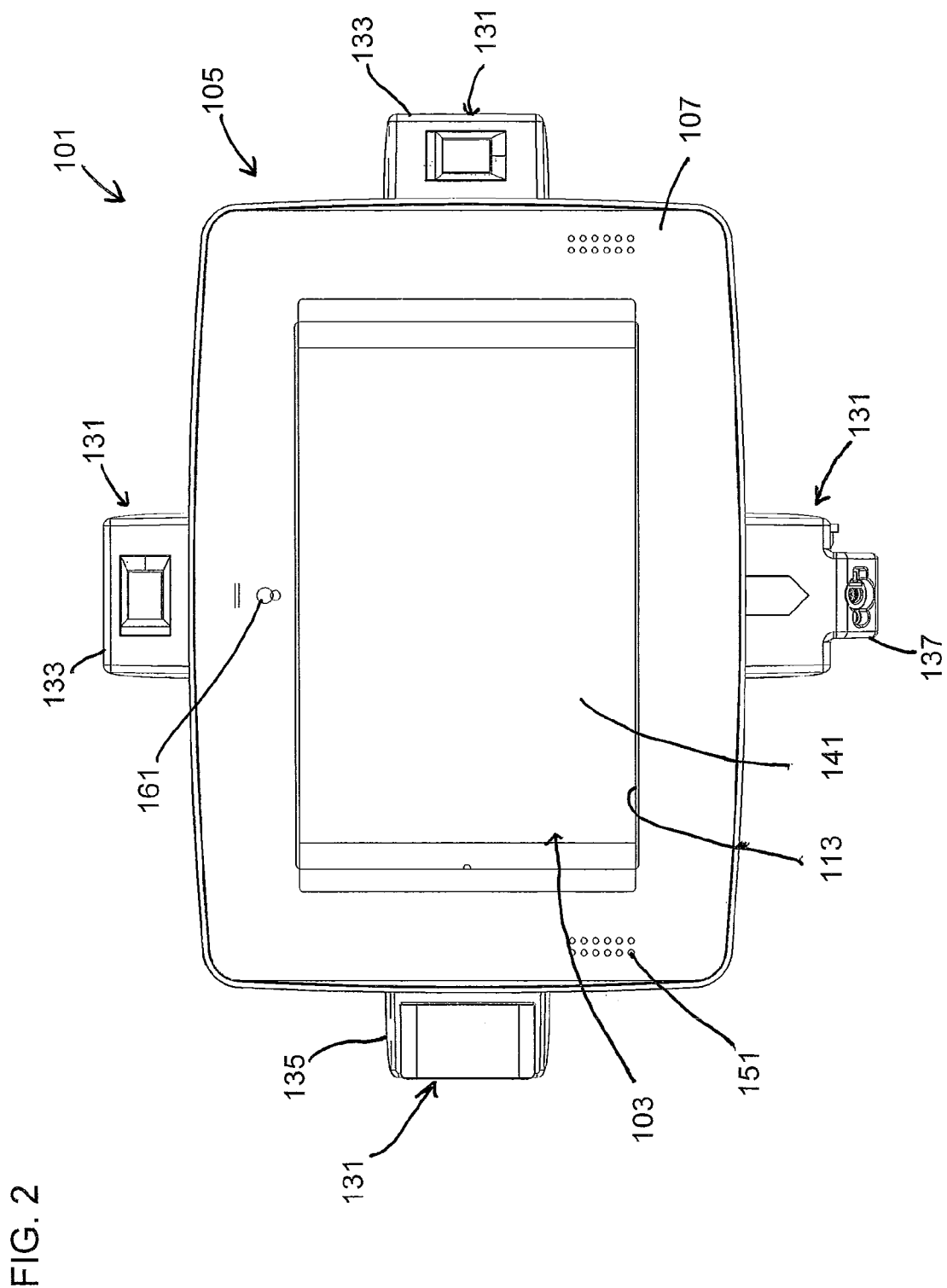
FIG. 2 is a front elevation of the system illustrated in FIG. 1.
Figure 3:
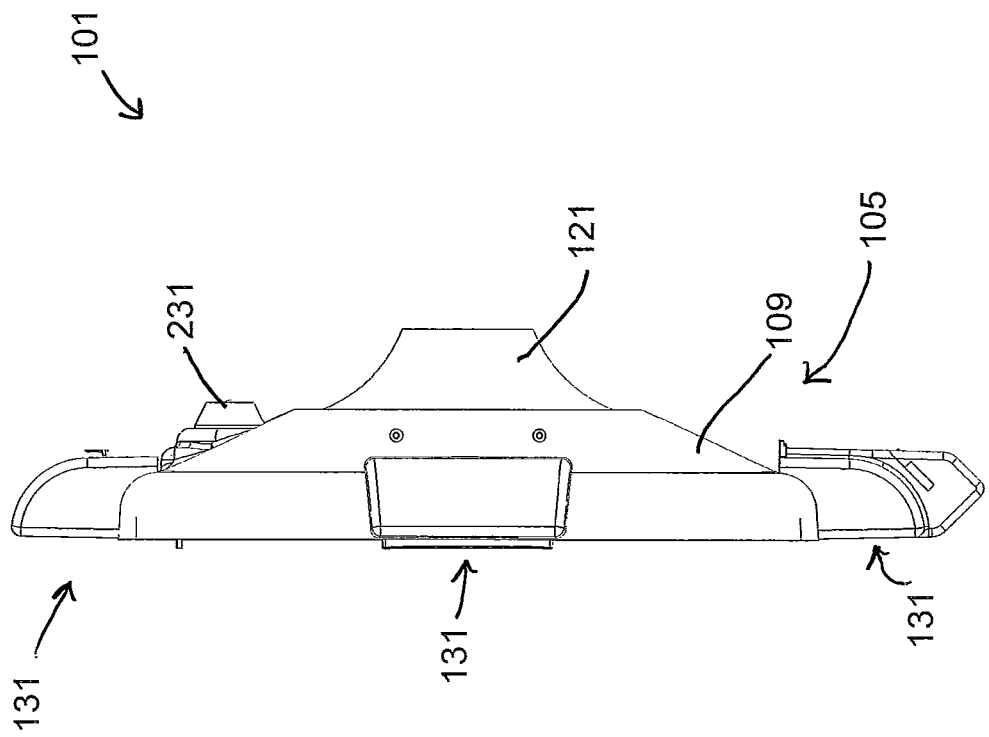
FIG. 3 is a right side elevation of the system illustrated in FIG. 1.
Figure 4:
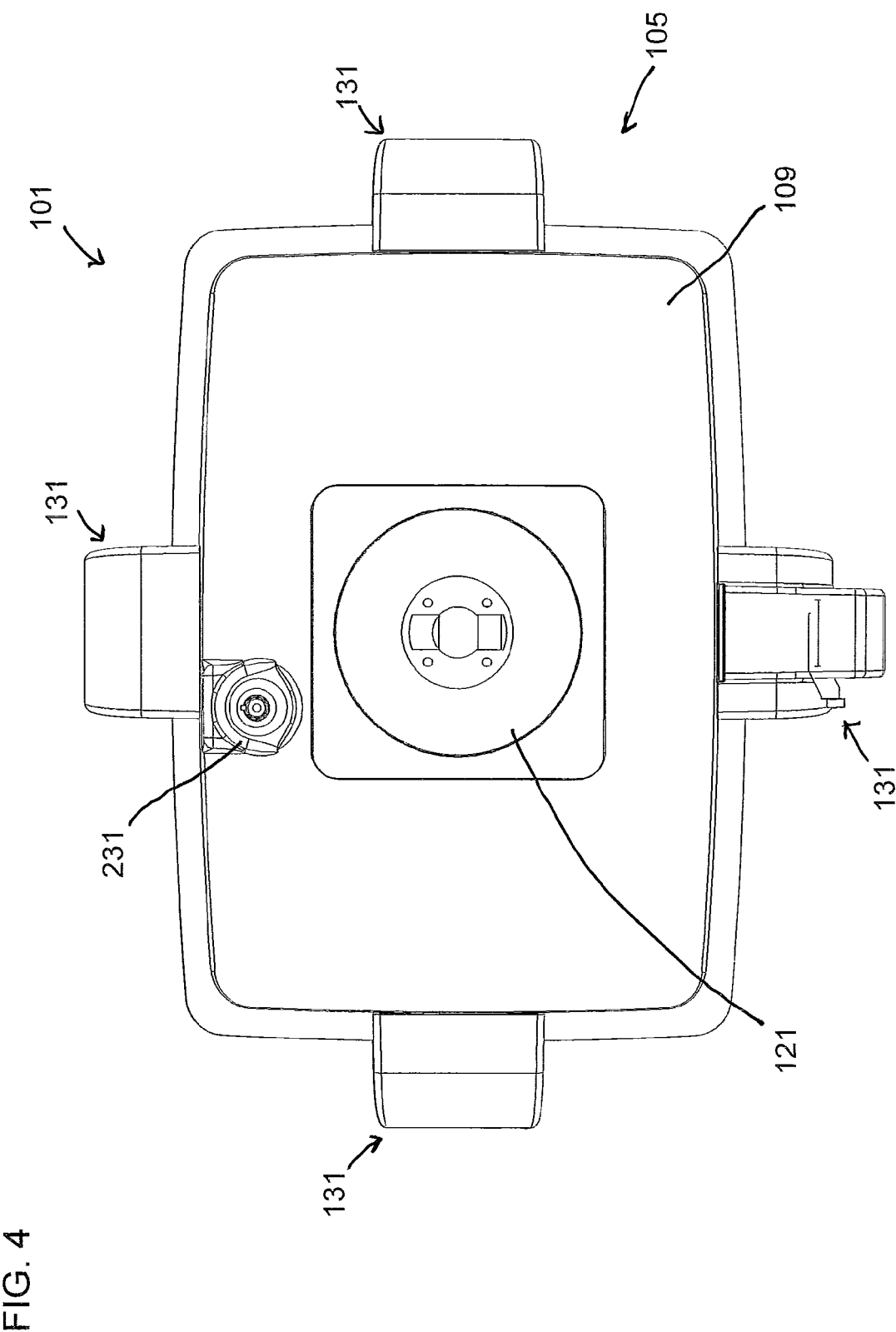
FIG. 4 is a rear elevation of the system illustrated in FIG. 1.
Figure 5:
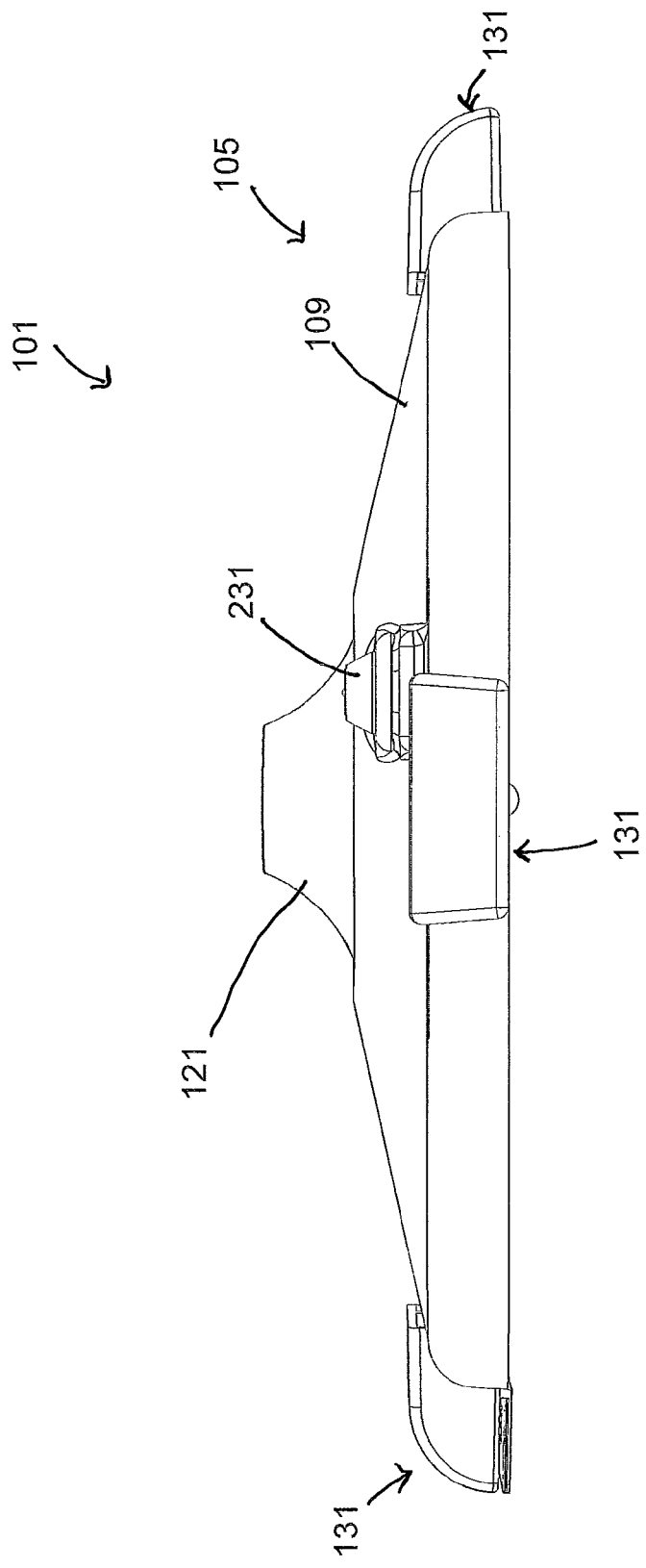
FIG. 5 is a top plan of the system illustrated in FIG. 1.
Figure 6:
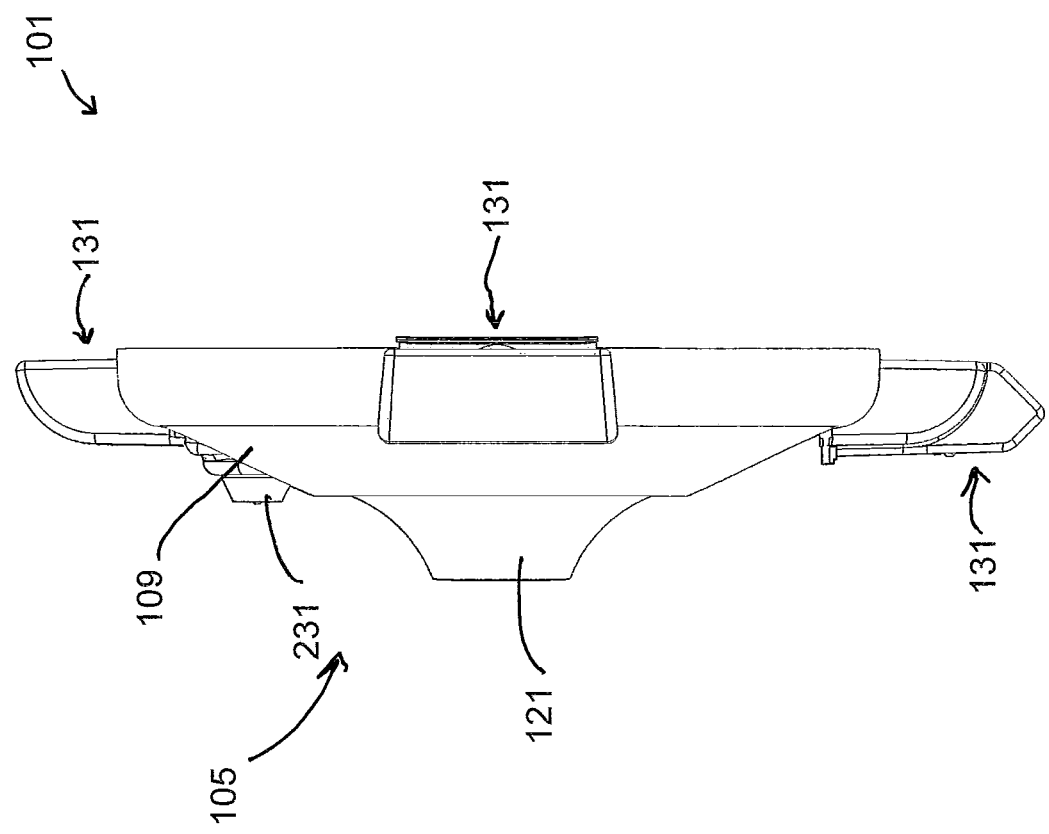
FIG. 6 is a left side elevation of the system illustrated in FIG. 1.
Figure 7:
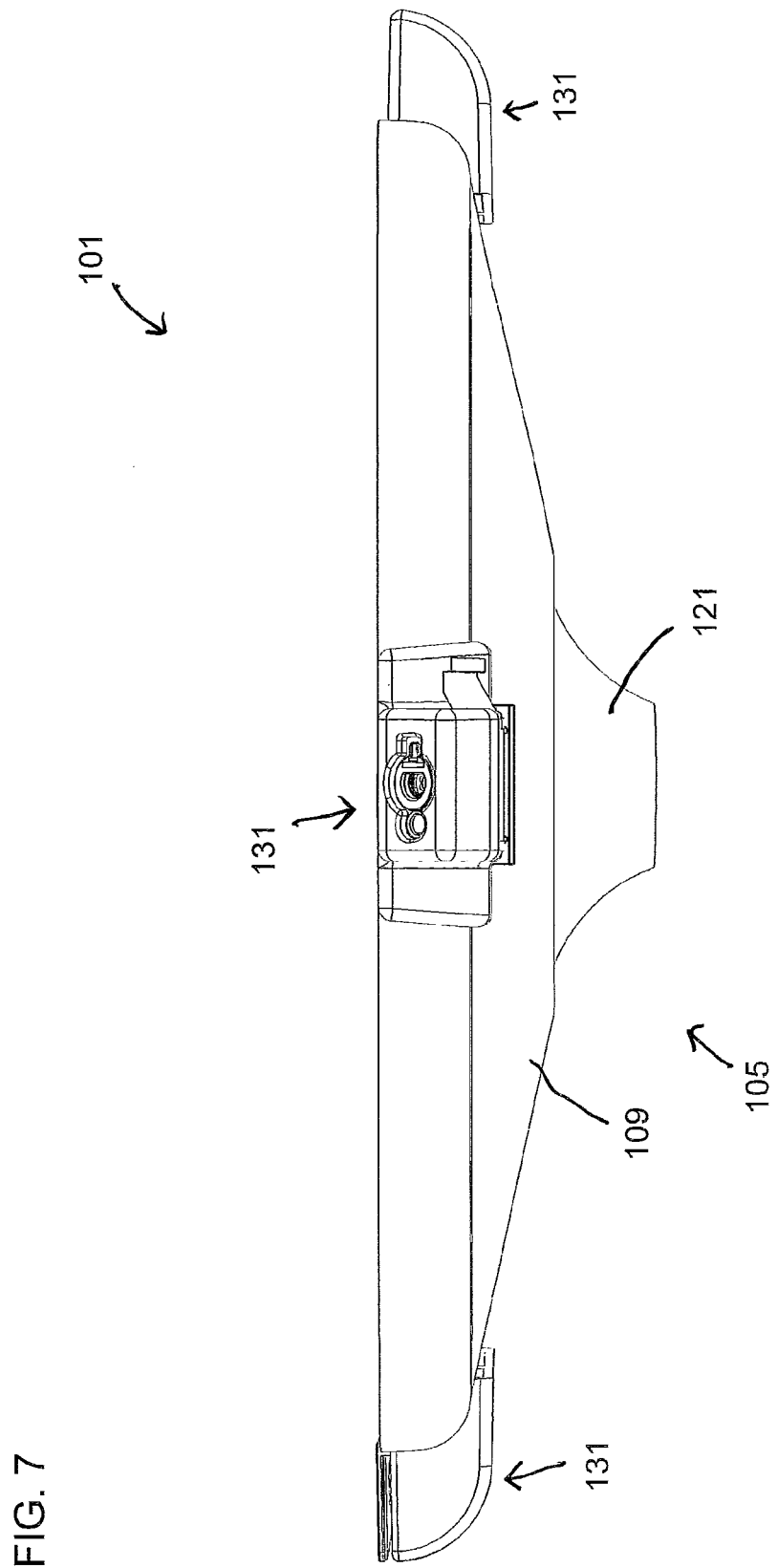
FIG. 7 is a bottom plan of the system illustrated in FIG. 1.

The peripheral devices 131 can include a wide variety of different devices. For example, a non-limiting list of devices that are suitable peripheral devices 131 includes a magnetic strip reader (e.g., for reading magnetic strips on cards or other objects), a barcode reader/barcode scanner, RF ID reader (for reading cards and/or other objects), fingerprint reader, EMV reader, EMV contactless reader, PCI contactless reader, EMV contact reader, PCI contact reader, passport reader, NFC reader, Pin reader, PIN PAD, keypad, EMV keypad, PCI keypad, printer, and keyboard. The set of devices used as the peripheral devices 131 in any particular system can include any combination of peripheral devices. The ability of the system 101 to accommodate any desired combination of peripheral devices 131 allows the system to be adapted for a wide variety of specific applications. Referring to FIG. 2, for example, the peripheral devices 131 include multiple fingerprint readers 133, a bar code scanner 135, and a magnetic strip reader 137. This combination of peripheral devices 131 may be desirable in retail settings, where for instance the bar code scanner 135 can be used to scan products for price checks and/or during check out. The magnetic strip reader 137 can be used to process credit card and/or debit card payments. The fingerprint readers 133 can be used to provide biometric security to ensure that an authorized employee (verified by fingerprint) who is accountable for the check-out process is present for the check-out. The fingerprint readers 133 may also be used for biometric payment security, if desired.

Figure 14:
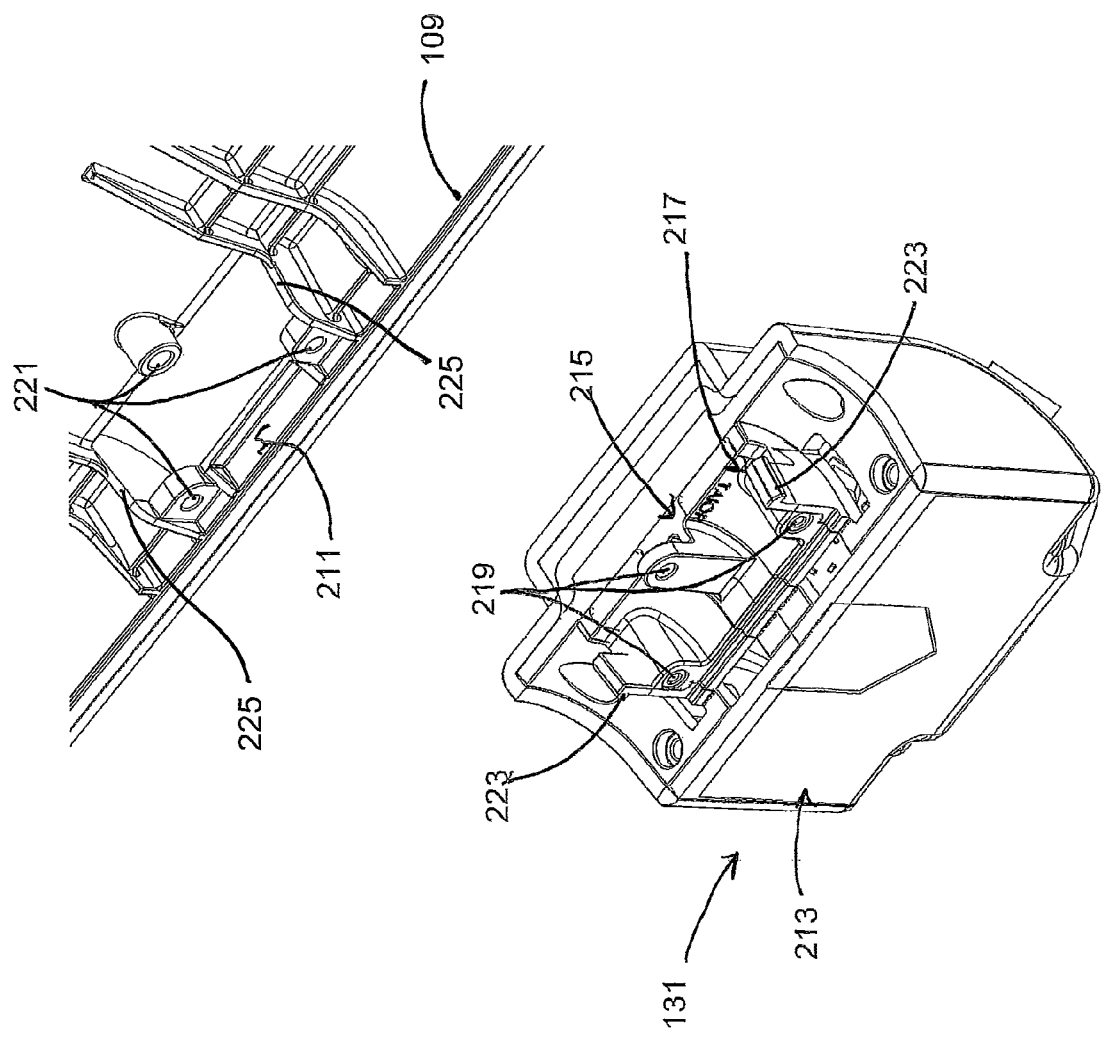
FIG. 14 is a partially exploded enlarged perspective illustrating one embodiment of an interface between an a portion of the enclosure of the system and a peripheral device.

The peripheral devices 131 are suitably secured to the enclosure 105, as illustrated in FIGS. 1-7 for example. Referring to FIG. 14, the enclosure 105 suitably has one or more openings 211 (e.g., one opening for each peripheral device) for providing access to the interior space 111 for the peripheral device. The openings 211 provide a path for hard wiring that may be desired. Also, the openings 211 and the parts of the enclosure 105 in the vicinity of the openings are configured to interface with the peripheral devices 131 in a manner that limits access to the interior space through the opening when the peripheral device is secured to the enclosure. The enclosure 105 suitably includes peripheral casings 213 substantially enclosing the peripheral devices 131. The peripheral casings 213 protect the peripheral devices 131 contained therein. The peripheral casings 213 are also sized and shaped to extend through the openings 211 and block access to the interior space 111 of the enclosure 105 through the openings. The casings 213 suitably each comprise a physical interface that secures the casing to at least one of the first and second parts 107, 109 of the enclosure 105 and positions the respective casing in the opening. The physical interfaces on the various casings 213 for the peripheral devices 131 are substantially identical so the peripheral devices are interchangeable. This allows various different types of peripheral devices 131 to be connected to any one of the openings 211, which provides flexibility in which peripheral devices are selected for use with any particular tablet computer 103 and flexibility in where specific peripheral devices are positioned on the enclosure 105.

Figure 15:
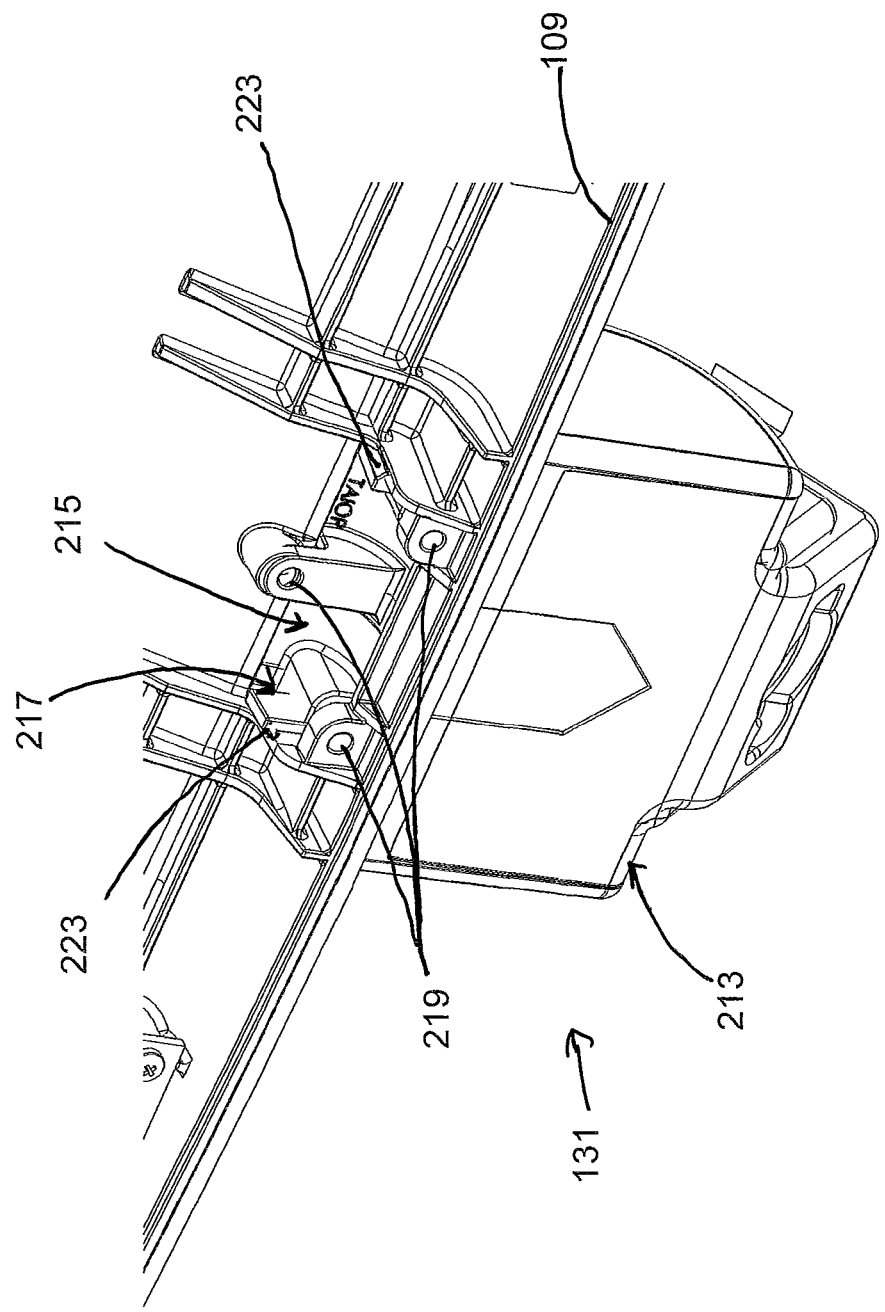
FIG. 15 is an enlarged perspective similar to FIG. 14 showing the connection between the peripheral device and the enclosure.

In FIG. 14, for example, the peripheral device 131 is secured to a plug 215 that is sized and shaped to substantially plug the opening 211 when the peripheral device is secured to the enclosure 105, as illustrated in FIG. 15. The plug 215 includes one or more retainers 217 that operate with the enclosure to retain the plug in the opening and thereby retain the peripheral device 131 on the enclosure 105. In FIGS. 14 and 15 for example, the plug 215 includes one or more bores 219 that align with one or more corresponding bores 221 inside the enclosure when the plug is in the opening so one or more screws (not shown) can be used to secure the plug and the peripheral device to the enclosure 105. In FIG. 15, the plug 215 has three bores 219 that align with three bores 221 in the enclosure 105. The plug 215 in FIG. 15 also includes a pair of detents 223 configured to be snapped into the opening 211 so they latch onto the side edges 225 of the opening. The detents 223 help hold the plug 215 and the peripheral device 131 more securely to the enclosure. The detents 223 can also help hold the bores 219, 221 in proper alignment before the screws are in place. If there are more openings 211 provided in the enclosure than are desired for peripheral devices 131 by a particular user, a plug 215 that is not attached to any peripheral device can be used to pug the unused openings 211 to limit access to the interior space 111.

Figure 16:
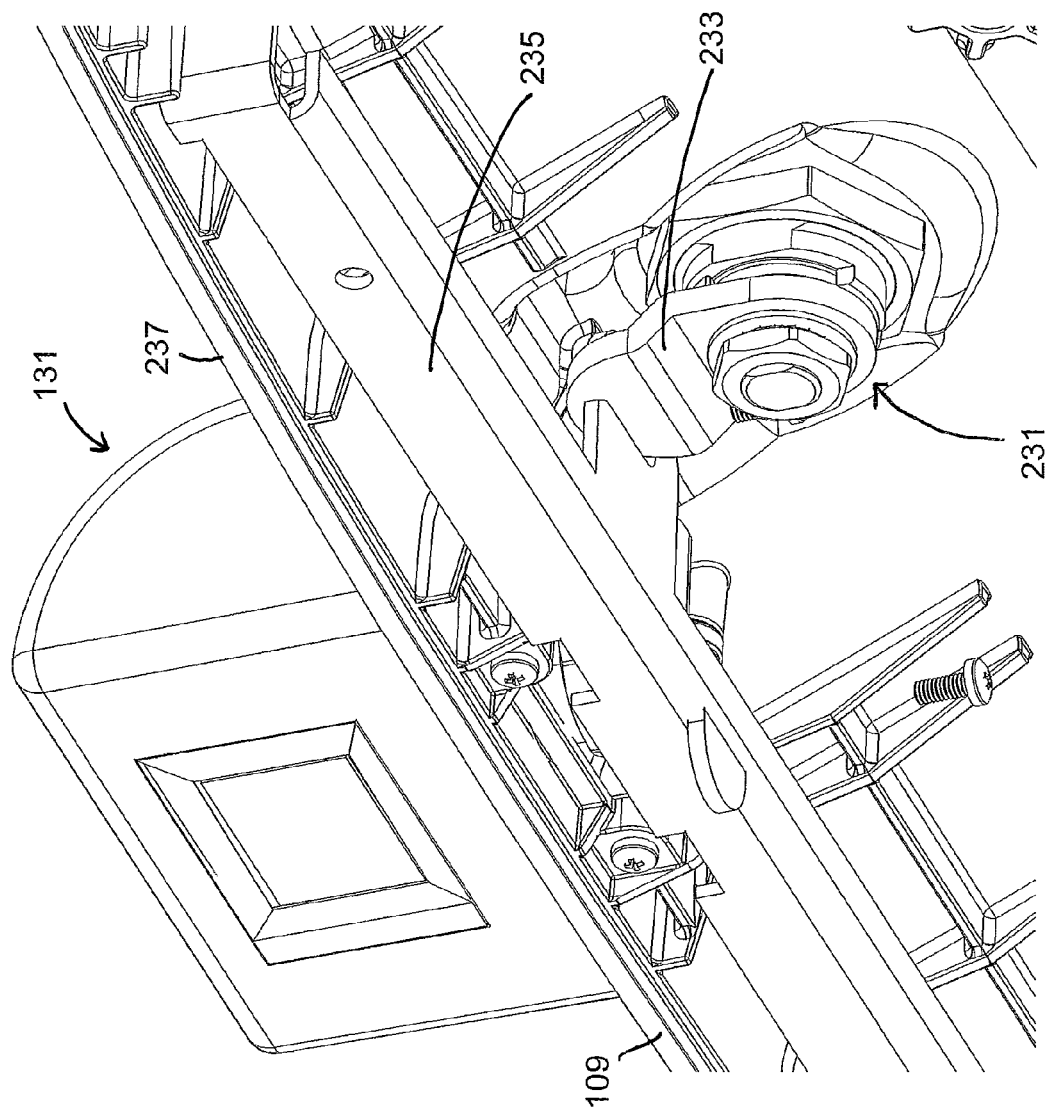
FIG. 16 is an enlarged perspective of a portion of the system showing a lock and a barrier positioned to protect the lock from unauthorized tampering, illustrating the lock in a locking configuration.
Figure 17:
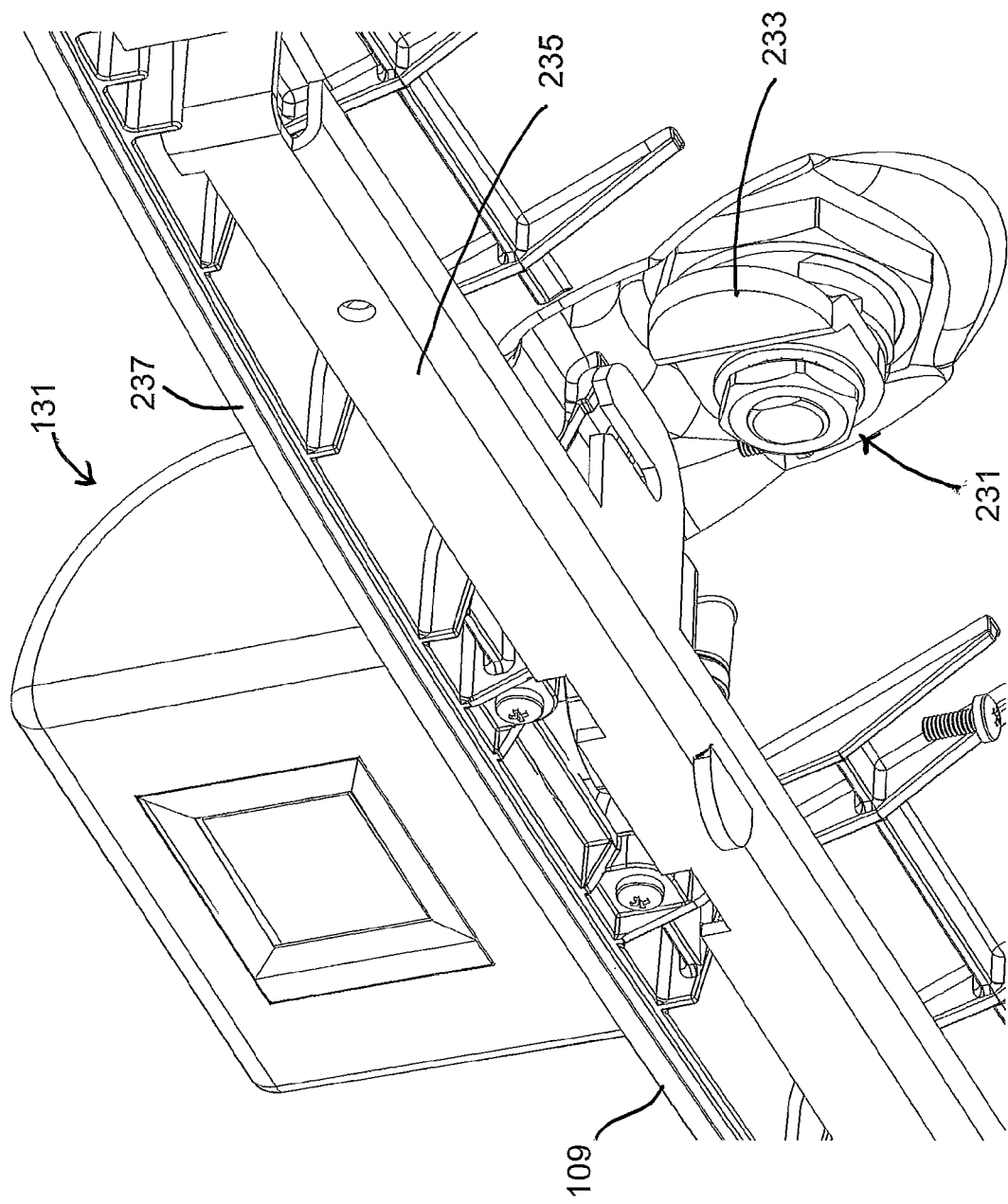
FIG. 17 is an enlarged perspective similar to FIG. 16 showing the lock in a non-locking configuration.

The system 101 also includes a lock 231 configured to limit unauthorized access to the tablet computer 103 and the host electronic board 115 when they are within the enclosure 105. The lock 231 suitably also limits unauthorized tampering with connections between the peripheral devices 131 and the tablet computer 103 and/or host electronic board 115. In the illustrated embodiment, the lock 231 also limits unauthorized removal of peripheral devices 131 that may be attached to the enclosure 105. The lock 231 is suitably configured to selectively convert from an unlocked configuration in which the first and second parts of the enclosure 107, 109 can be moved to the open position (FIG. 8) and a locked configuration in which the first and second parts of the enclosure cannot be non-destructively moved from the closed position (FIGS. 1-7) to the open position (FIG. 8). The lock 231 has an external portion (e.g., on the back 109 of the enclosure as illustrated in FIGS. 3-6, which is configured to receive a key used to open and close the lock. Referring to FIGS. 16 and 17, the lock 231 also has an interior portion that is inside the interior space 111 of the enclosure 105. As illustrated the lock includes a locking tab 233 that is rotatable by the key between a locking position (FIG. 16) and a non-locking position (FIG. 17). It is understood this particular lock 231 is just one example and that other locks can be used within the scope of the invention. The enclosure 105 has a joint 237 where the front and back 107, 109 of the enclosure meet and are adjacent one another. A barrier 235 is positioned between the joint 237 and the interior portion of the lock 231 to block attempts to pick the lock by accessing the interior portion of the lock via the joint in the enclosure. As illustrated in the drawings, the barrier 235 is suitably an L-shaped beam extending along the joint 237 between the joint and the lock 231.

The enclosure 105, including the front 107, back 109, and peripheral casings 213 of the peripheral devices 131 suitably protect the tablet computer 103, the host electronic board 115 and all the peripheral devices 131 from physical and environmental damage. The components of the enclosure 105 are suitably made from a relatively rigid durable material, such as an engineering plastic. If desired, the enclosure is sealed to limit entry of dust and/or moisture. For example, the enclosure 105 has an ingress protection rating of IP54, meaning only limited amounts of dust may enter the enclosure and that water splashing against the enclosure from any direction will not have any harmful effects. IP54 is just one example of an ingress protection rating that can be achieved for the enclosure 105. It is understood that other levels of protection against dust and moisture can be provided if desired. Further, it is understood that using the enclosure 105 to provide protection against dust and/or moisture is optional.

Figure 18:
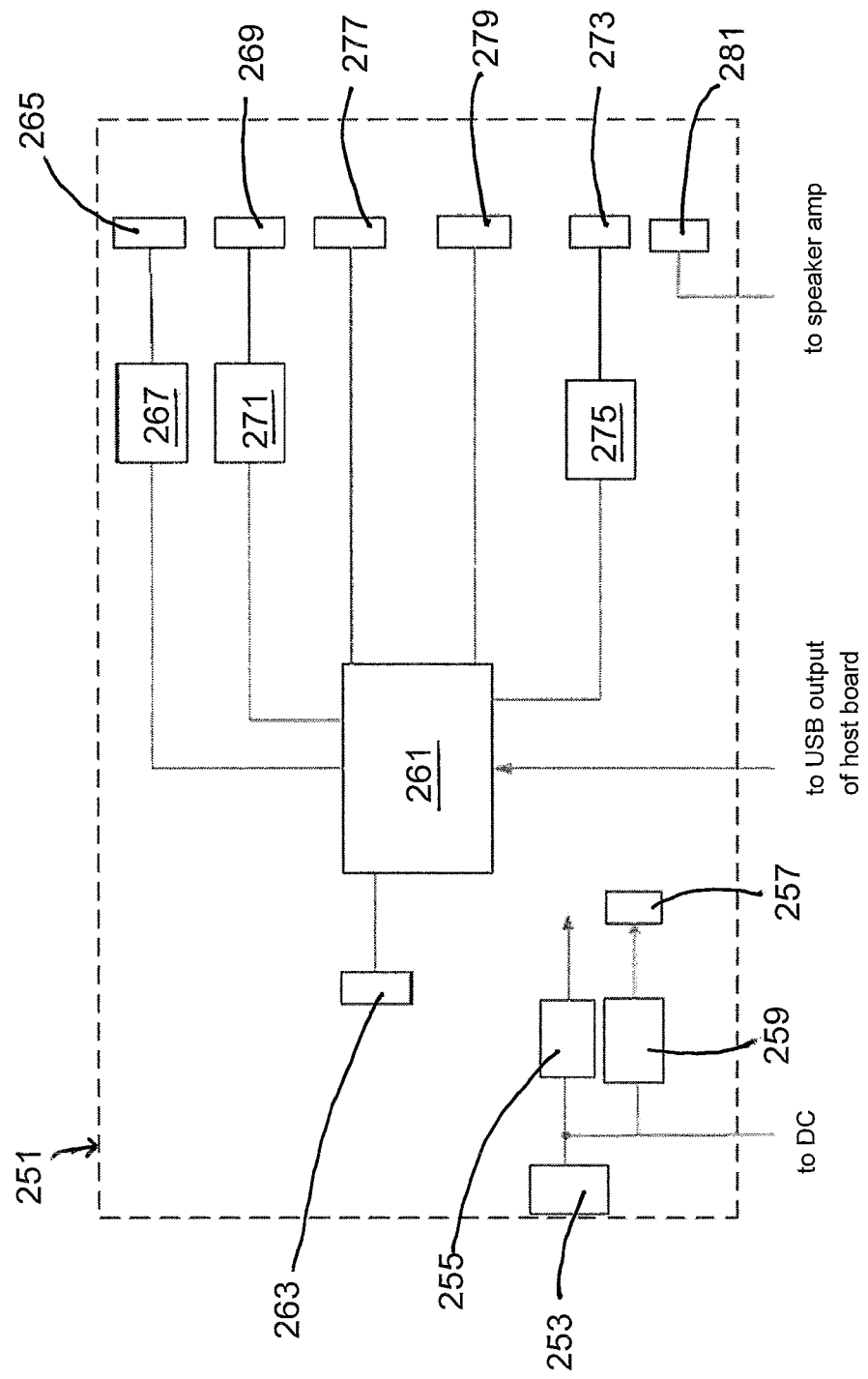
FIG. 18 is a schematic diagram of one embodiment of a receiver electronic board that can be connected to the host electronic board illustrated in FIGS. 11-13.
Figure 19:
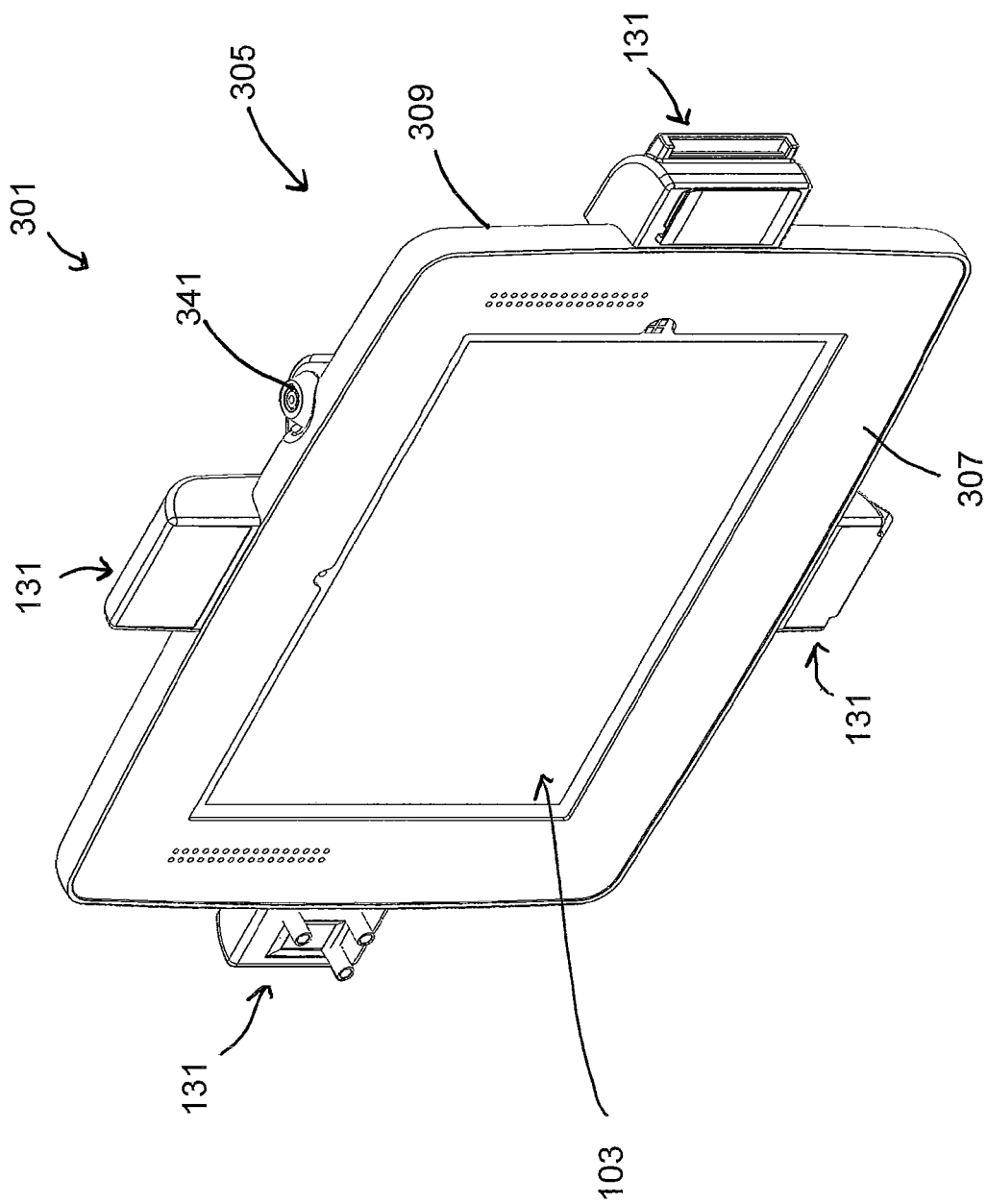
FIG. 19 is a perspective of another embodiment of a system of the present invention.

The system 101 is suitable for use as a stand-alone unit, either as a portable hand-held unit or as a mounted unit mounted by the mount 121 to a corresponding wall mount, a desk or countertop mount, or a floor mount. When the system 101 is mounted, it can be desirable to include additional components in the structure to which the system 101 is mounted. For example, in a point-of-sale setting, it can be desirable for the tablet computer 103 to be oriented to be employee-facing while another touch screen device (e.g., a customer-facing kiosk or display) is included in the base or mount. FIG. 18 illustrates one embodiment of a receiver electronic board 251 that is suitable for connection to the host electronic board 115. The receiver electronic board 251 can be enclosed in the enclosure if desired, but it may be more desirable to include the receiver electronic board in a wall mount, desk or countertop mount, or in a floor mount to provide added functionality. As illustrated, the receiver electronic board includes one or more communication ports. Suitable communication ports include USB port, serial ports, Ethernet ports, and GPIO communication ports. The receiver electronic board 251 illustrated in FIG. 18 includes a DC jack 253 that is connected to the DC connector of the host electronic board 115, along with a 5 v buck boost converter 255, a power switch 259, and a DC out header 257. The receiver electronic board 251 also has a USB hub 261 that is connected to the USB hub 183 of the host electronic board 115. The USB hub 261 in the receiver electronic board 251 is connected to an internal USB header 263 and several communication ports, including an RS232 Conn port 265 via a USB/Serial adapter 267, a RJ45 port 269 via a USB/Ethernet adapter 271, and a GIPO port 273 via a USB/IO adapter 275. The USB hub 261 is also connected to a Dual USB A port 277 and a PoweredUSB port 279. The receiver electronic board 251 also suitably includes a speaker header 281 that is connected to the speaker amplifier of the host electronic board. The embodiment illustrated in FIG. 18 provides just one example of a receiver electronic board. It is understood that any of the features therein can be omitted if desired and that different functions can be added by including additional components.

Figure 20:
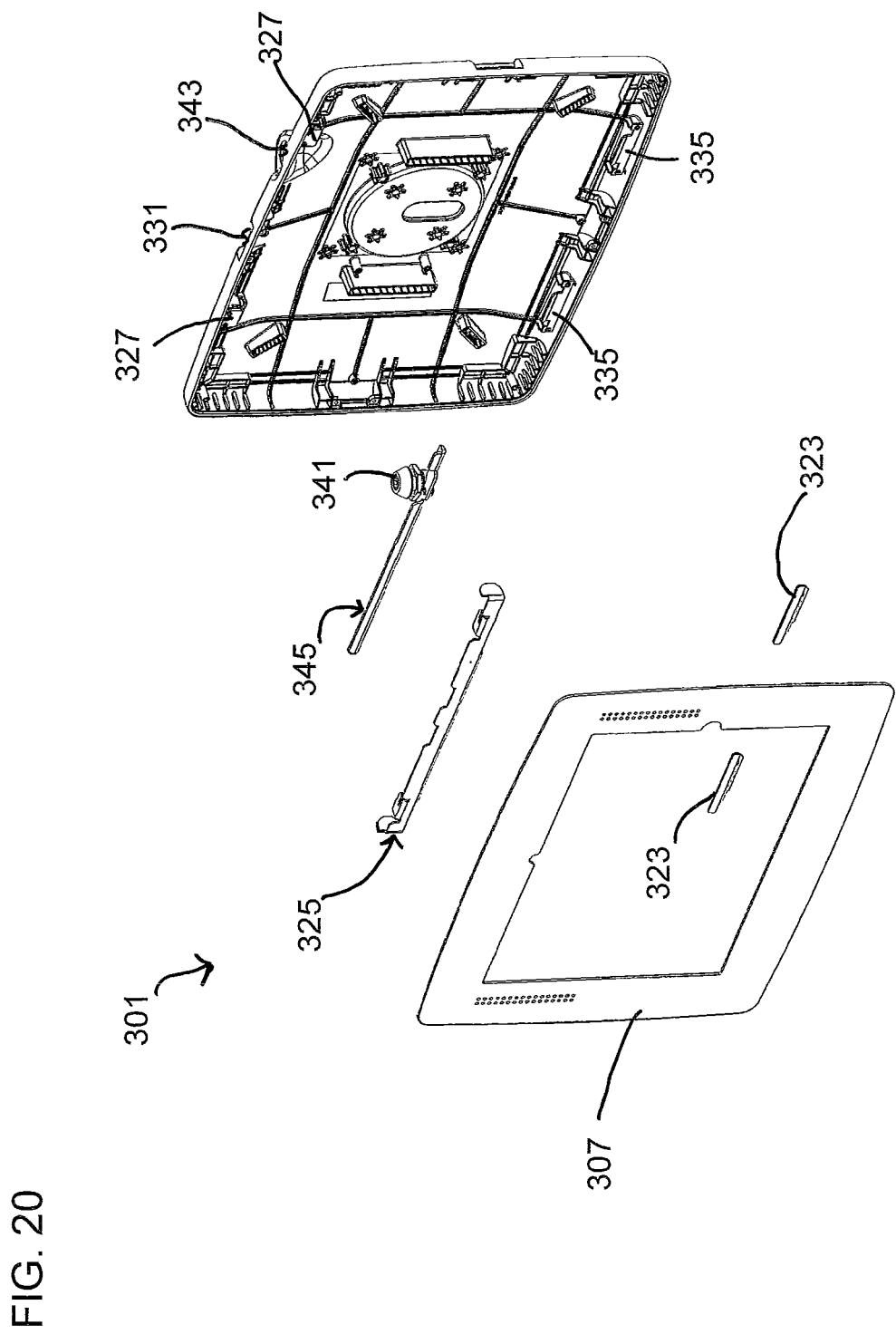
FIG. 20 is an exploded perspective of one embodiment of a locking system that is part of the system illustrated in FIG. 19.
Figure 21:
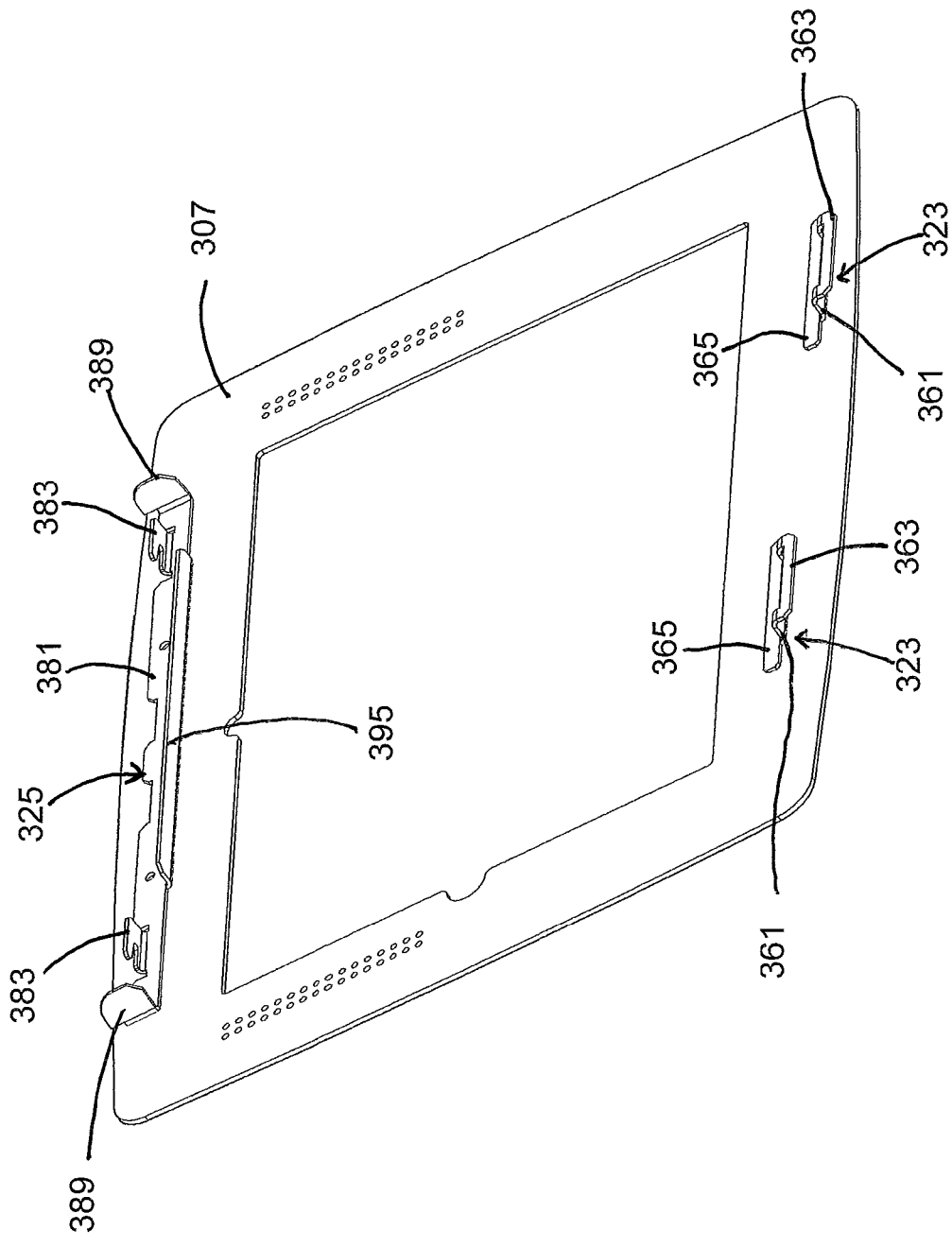
FIG. 21 is a perspective of one embodiment of a front plate and associated parts of the locking system of FIG. 20.

Another embodiment of a system for use with a tablet computer 103, generally designated 301, is illustrated in FIGS. 19-29. The system 301 is substantially similar to the system 101 described above except it has a different locking system 121, which will be described below. The system 301 includes an enclosure 305 that includes a front plate 307 and a back 309. Peripheral devices 131 are also connected to the system 301 in substantially the same manner and suitably uses the same host board 115 discussed above. Referring to FIGS. 20 and 21, the locking system 321 includes a pair of bottom latches 323 and a latch bar 325 that are secured (e.g. welded) to the back of the front plate 307. A pair of retaining plates 327 are secured to the back plate 309 just under its top edge on opposite sides of the opening 331 at the top of the back plate for a peripheral device 131. For instance, the retaining plates 327 are suitably fastened to the back plate 309 using screws 329 or other suitable fasteners. The locking system 321 also includes a pair of anchors 335 secured to the bottom of the back 309 of the enclosure 305.

Figure 24:
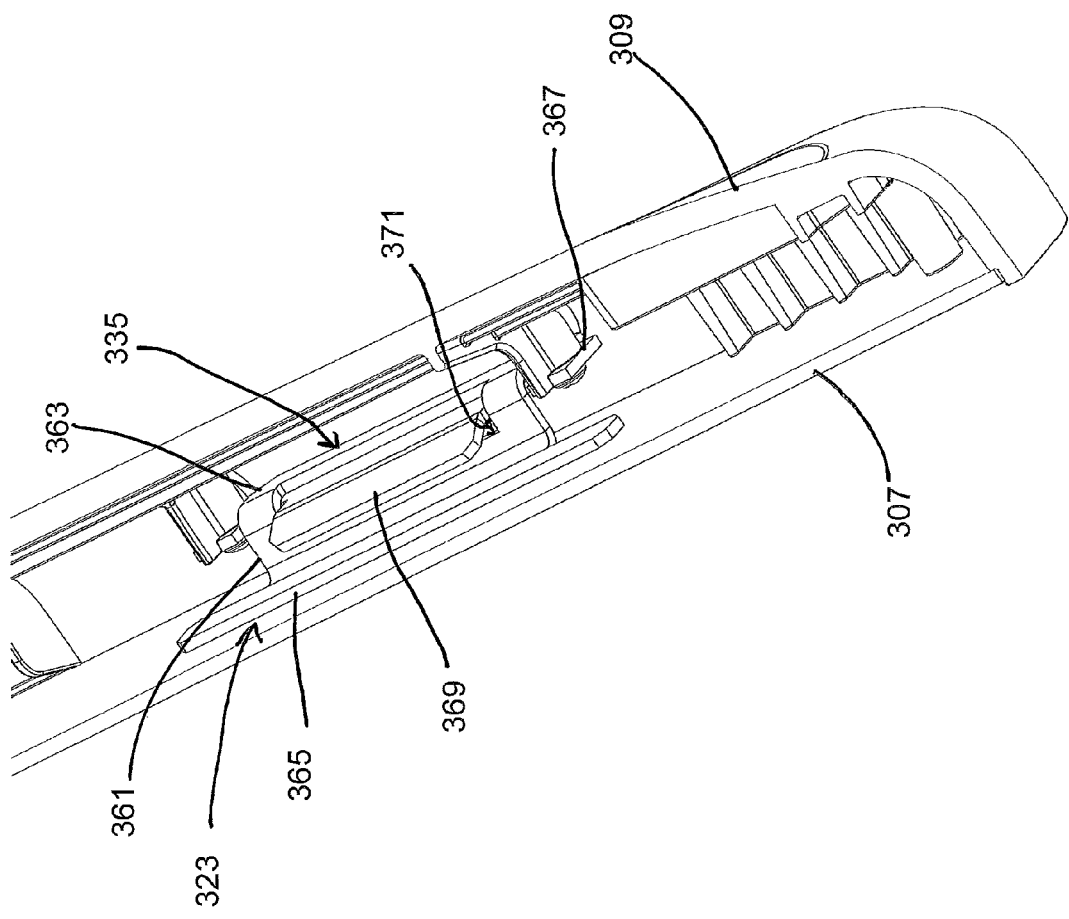
FIG. 24 is an enlarged perspective of a portion of the system illustrated in FIG. 19 with portions of the system removed to show internal features.
Figure 25:
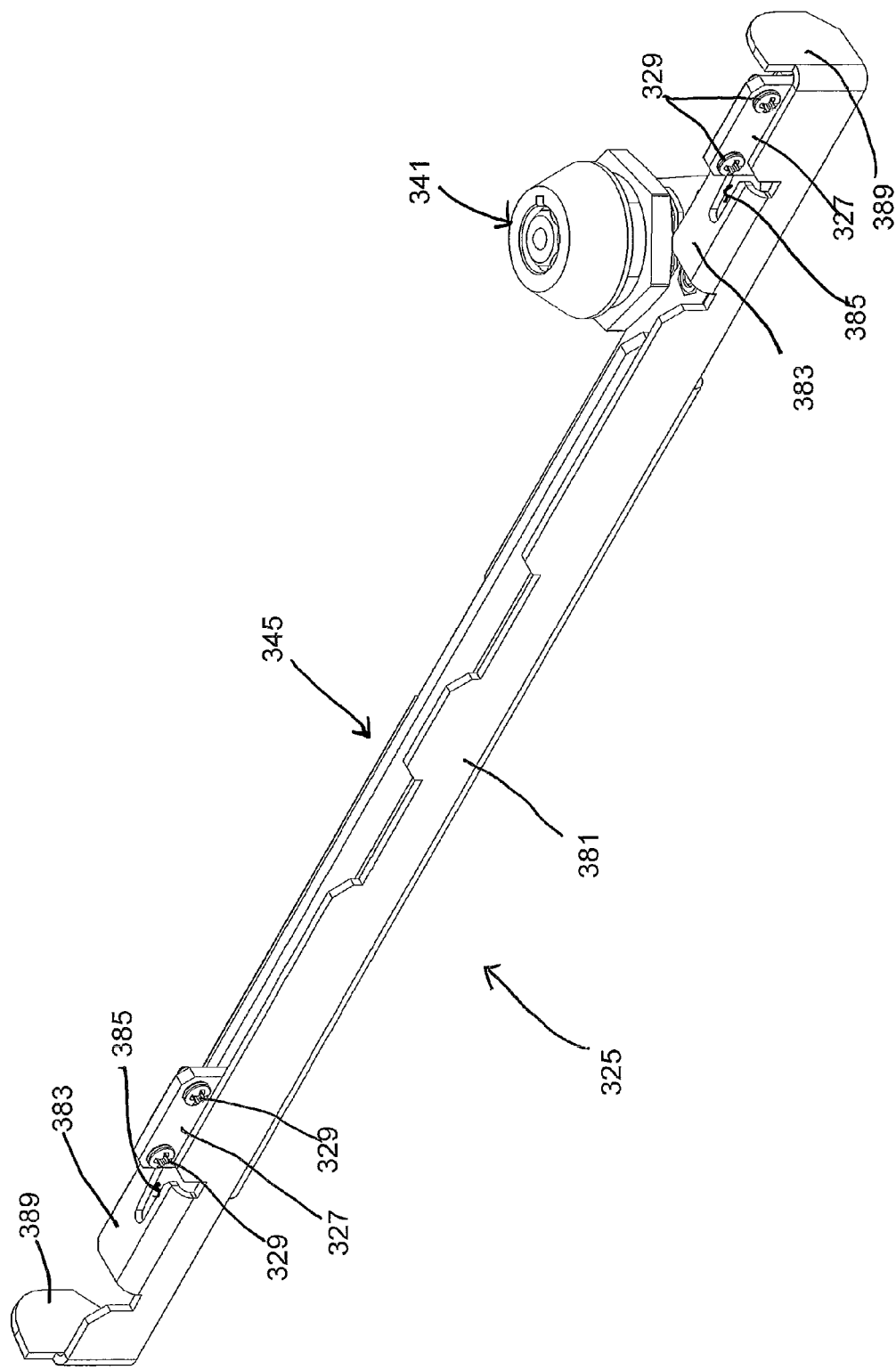
FIGS. 25 and 26 are perspectives from two different vantage points of one embodiment of a lock, lock bar, and latching bar of the locking system illustrated in FIG. 20, illustrated in a non-locking configuration.
Figure 26:
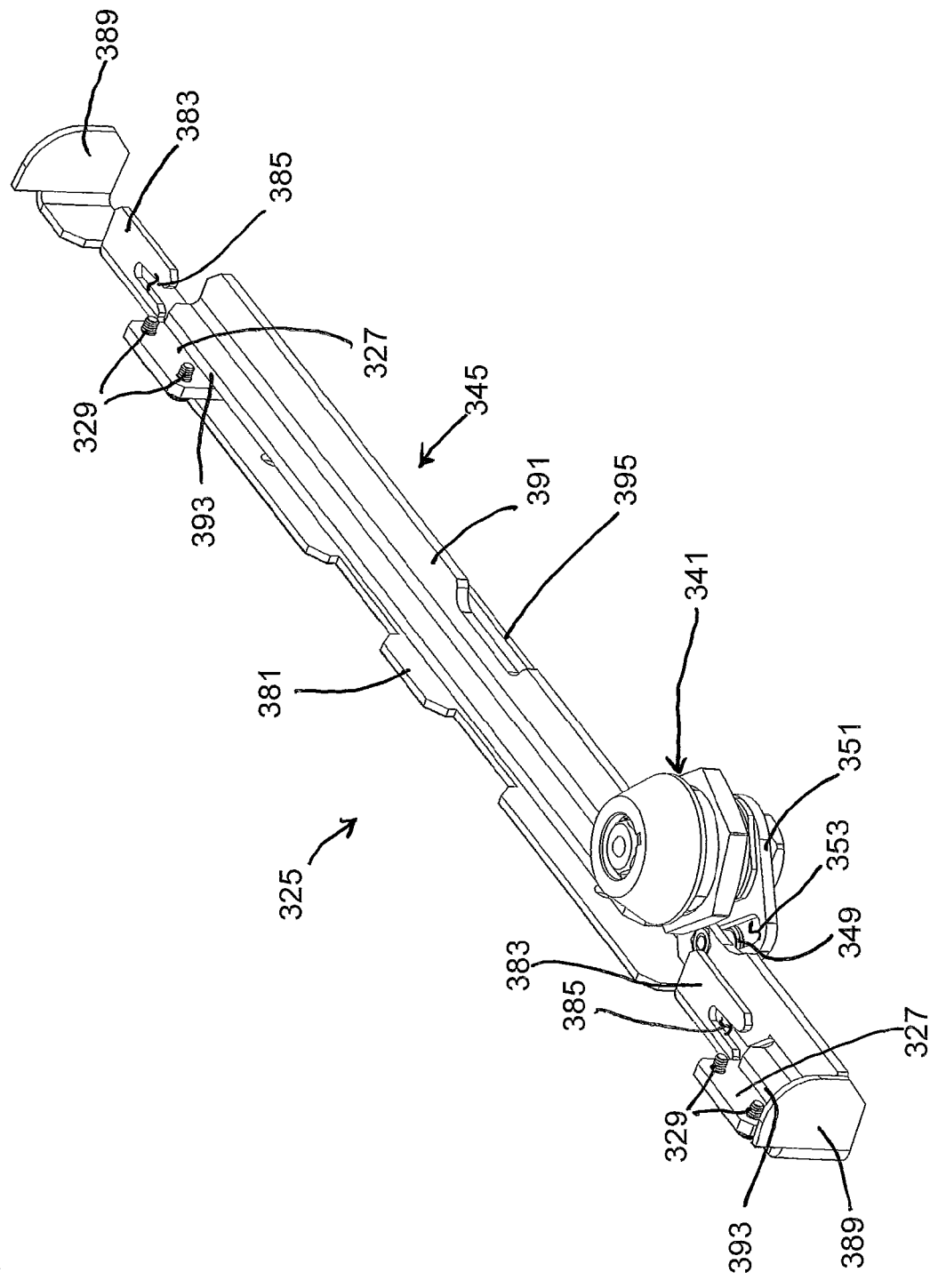

Referring to FIG. 24, the latches 323 on the bottom of the front plate 307 are configured to engage the bottom anchors 335 in a manner that blocks separation of the front plate 307 from the back plate 309 without pivoting the upper edge of the front plate away from the upper edge of the back 305 of the enclosure. As illustrated in FIG. 24, for example, the latches suitably include a base plate 365 that is secured (e.g., welded) to the front plate 307 and a hook portion having a first leg 361 extending away from the base plate and a second leg 363 extending generally parallel to the base plate. The bottom anchors 335 include a bar 367 (e.g., a flat plate) extending generally parallel to the front plate 307 and a protrusion 369 configured to extend through an opening 371 in the hook portions of the latches 323. As illustrated in FIG. 24, the protrusion is suitably angled slightly toward the front plate 307. When the latches 323 are engaged with the anchors 335 as in FIG. 24, the hook portions of the latches are hooked onto the bars 367 of the anchors and the protrusions 369 are received in the openings 371. When engaged in this manner the latches 323 must pivot in the direction of the arrow on FIG. 24 relative to the anchors 335 in order for the latches and anchors to be separated. Movement of the latches 323 away from the anchors 335 in a direction perpendicular to the front plate 307 without first pivoting the latches is blocked by the engagement of the hook portions of the latches with the bar portions 367 of the anchors.

The locking system 321 also includes a lock 341 that extends upward through an opening 343 in the back plate 309 so the lock is seated in the opening. The lock 341 is moveable via use of a key (not) shown between a locking position and a non-locking position. For example, the lock 341 is suitably rotatable within the opening 343 between its locking and non-locking positions, as indicated by the arrow in FIG. 19.

Figure 22:
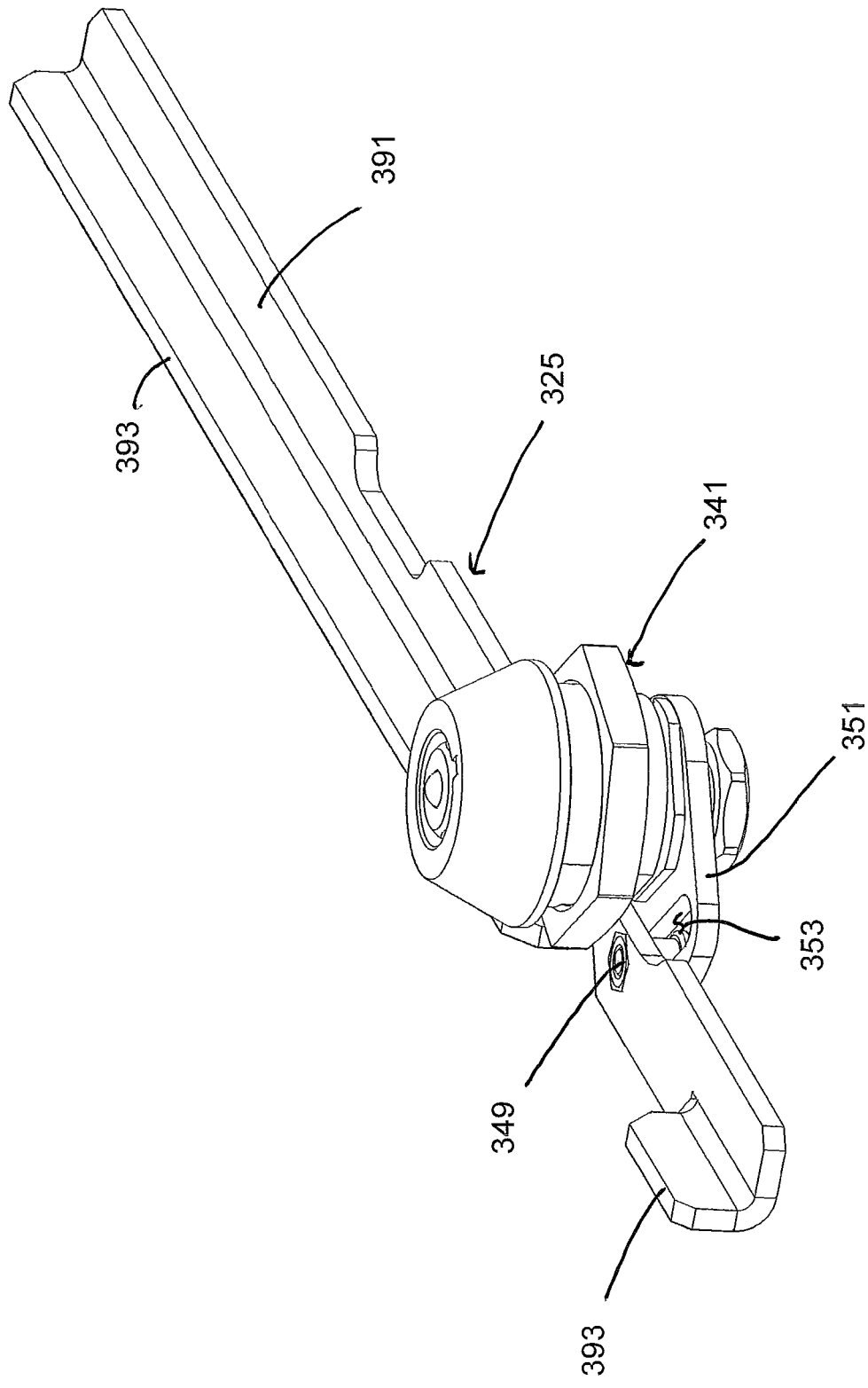
FIGS. 22 and 23 are perspectives from two different vantage points of one embodiment of a lock and lock bar of the locking system of FIG. 20.
Figure 23:
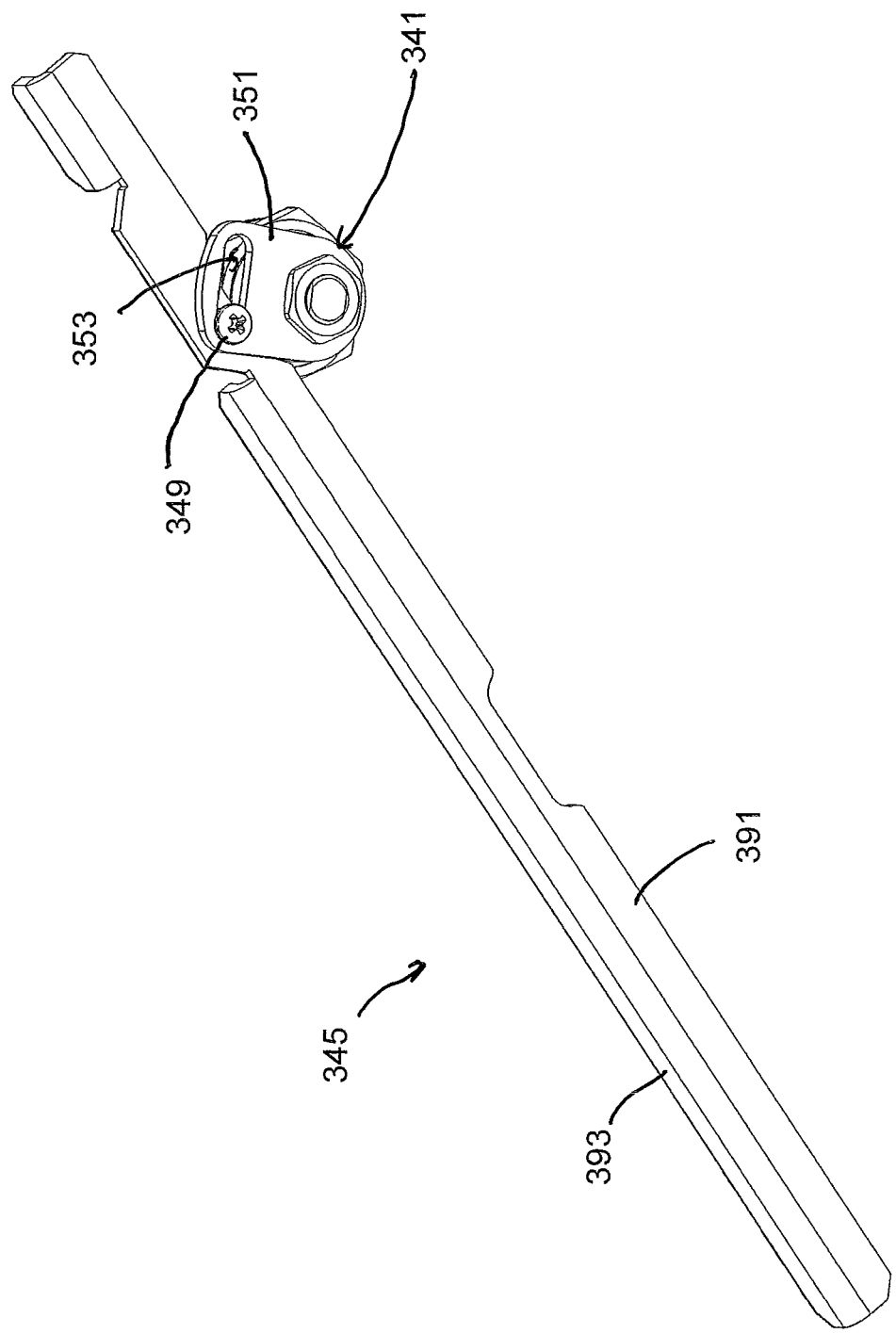

The lock 341 is suitably connected to a lock bar 345 so that movement of the lock 341 between its locking and non-locking positions requires translational movement of the lock bar. As illustrated in FIGS. 20 and 22-23, for example, the lock 341 includes a rotatable lock cam 351 that is connected to the lock bar 345 by a pin 349 (e.g., screw) extending through a slot 353 near the distal end of the cam. The pin 349 is loosely captured in the slot 353 so the pin can slide within the slot as the lock cam 351 rotates. The pin 349 and slot 353 connection converts rotational movement of the cam to translational movement of the lock bar 345.

Figure 27:
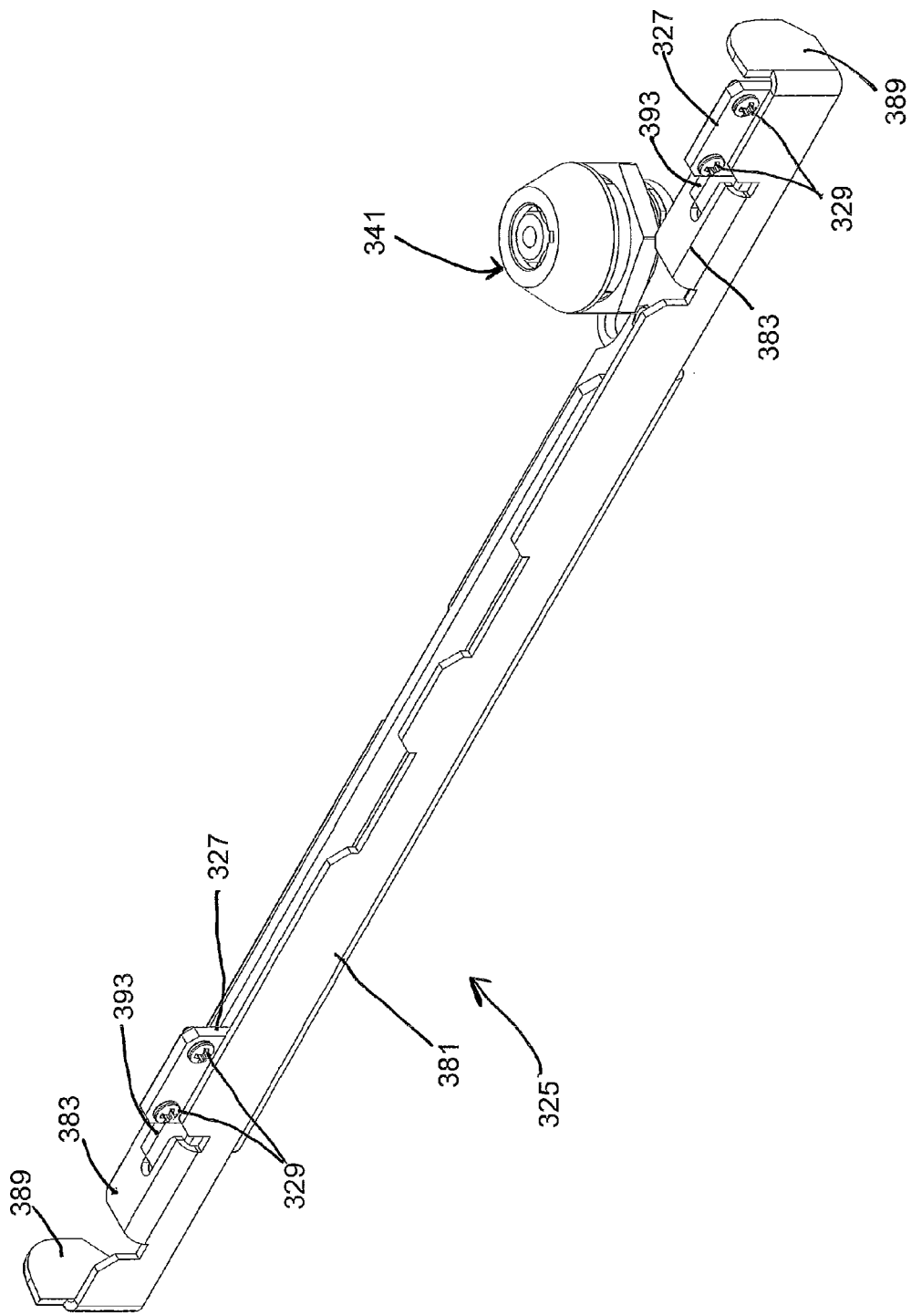
Figure 28:
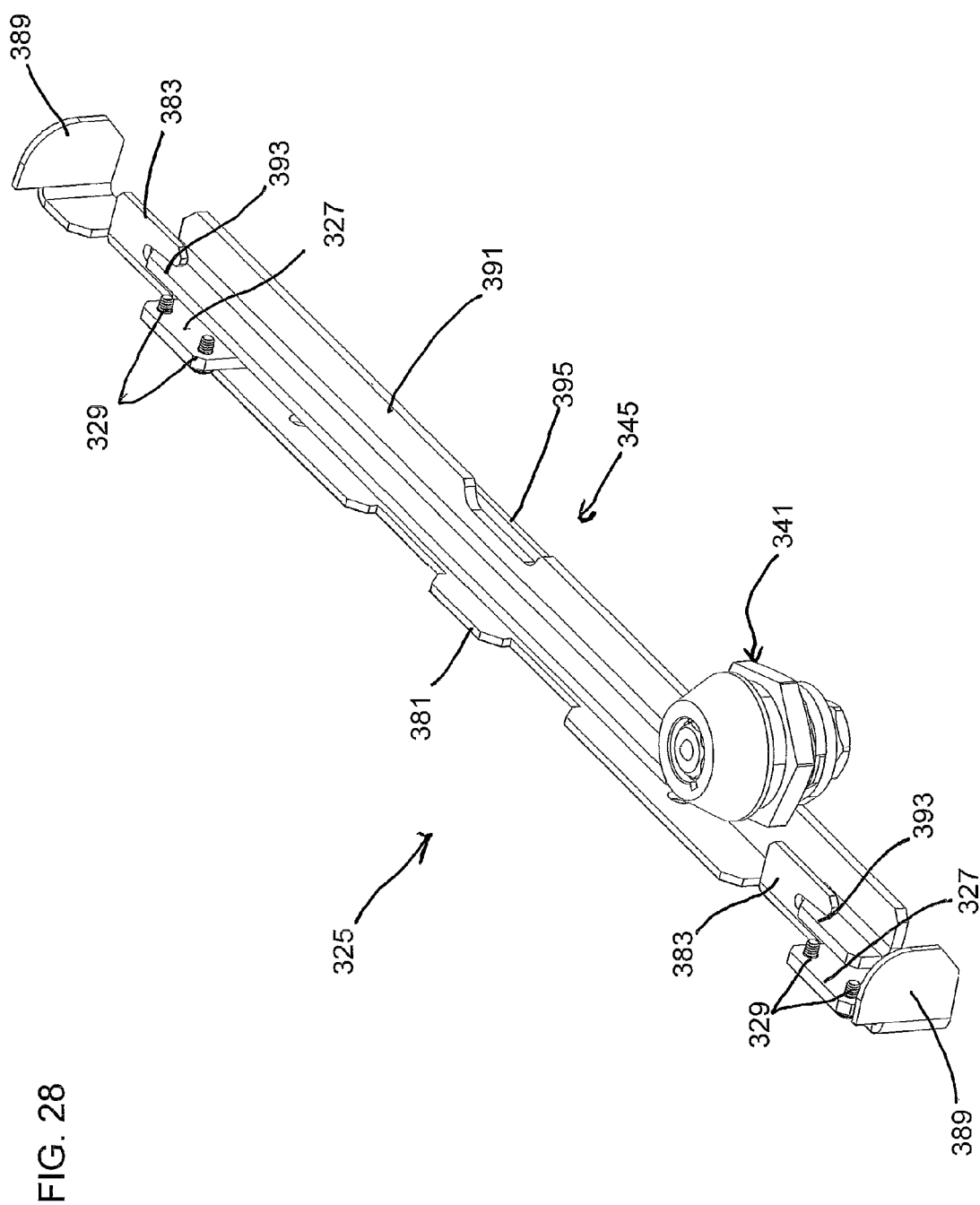
Figure 29:
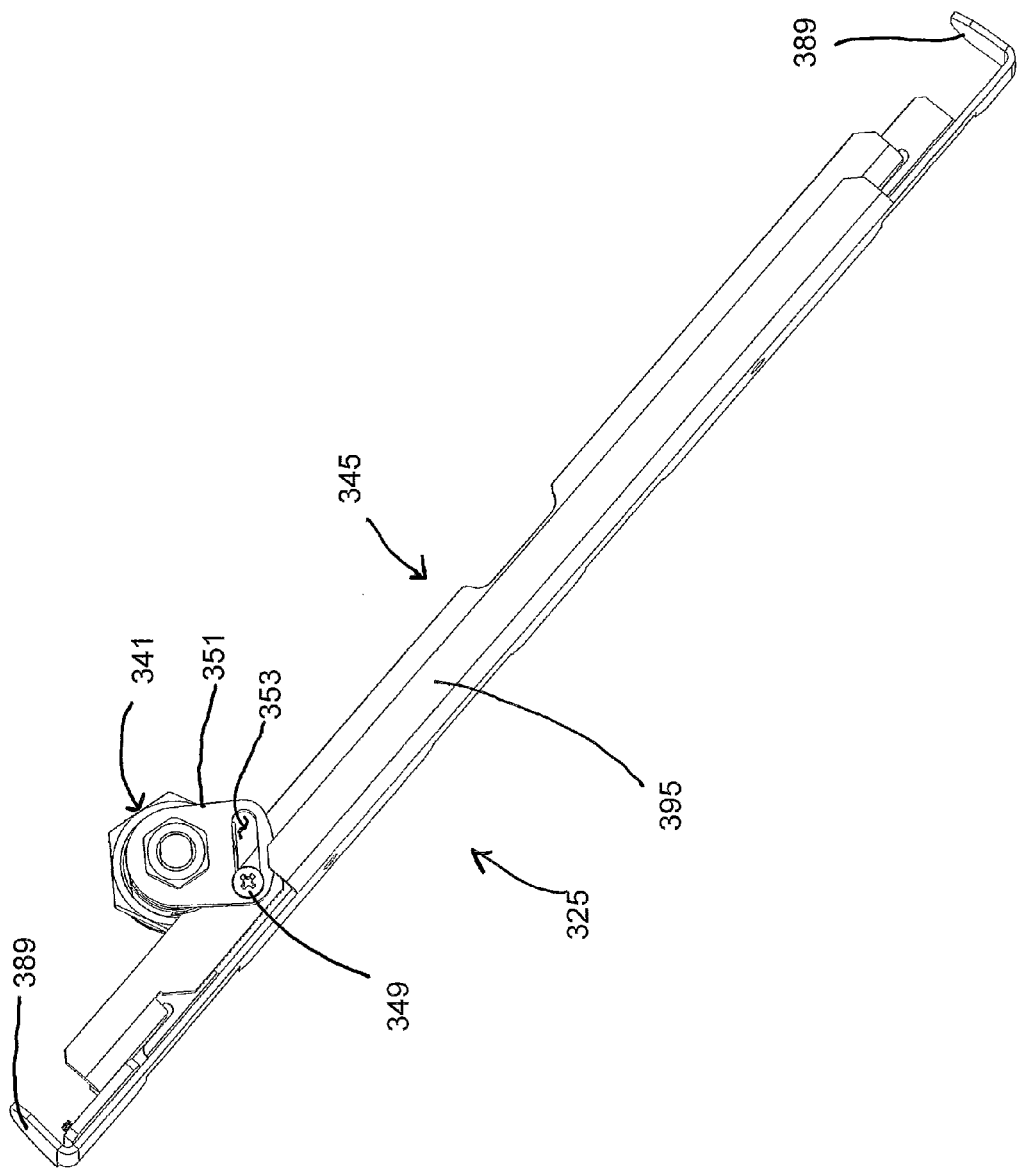

The lock bar 345 is positioned relative to the latch bar 325 so that movement of the lock 341 between it locking and non-locking configurations requires movement of the lock bar between a locking position (FIGS. 25 and 26) and a non-locking position (FIGS. 27-29). As illustrated in FIGS. 25-29, for instance, the latch bar 325 suitably has a base plate 381 that is secured to the front plate 307 and a pair of hooks 383 extending laterally away from the front plate 307 toward the back plate 309. In the illustrated embodiment, the hooks 383 of the latch bar 325 a generally flat rectangular tabs having slots 385 extending inward from one side. The latch bar 325 suitably also includes a pair of end tabs 389 that extend laterally away from the front plate 307 and toward the back plate 309. The end tabs 389 are suitably shaped and positioned to conform to the inner surface of the back plate 309.

The lock bar 345 and lock 341 are positioned alongside the latch bar 325 and generally between the end tabs 389. The retaining plates 327, which are fastened to the back 309 of the enclosure 305, hold the lock bar 345 in position relative to the back of the enclosure, although the retaining plates do allow the lock bar to slide lengthwise. The lock bar 345 suitably has a base plate 391 and ribs 393 extending up from the base plate in a direction generally parallel to the base plate 365 of the latch bar 345. The latch bar 325 and lock bar 345 are positioned alongside one another so that the ribs 393 on the lock bar are aligned with the slots 385 in the hooks 383 on the latch bar. The latch bar 325 suitably has a bottom plate 395 (FIG. 29) that extends under the base plate 381 of the lock bar 345 to provide additional support to the lock bar. Accordingly, movement of the lock 341 from its non-locking position (FIGS. 25 and 26) to its locking position (FIGS. 27-29) rotates the cam 351 which drives longitudinal movement of the lock bar 345 from its non-locking position to it locking position. As the lock bar 345 moves from its non-locking position to its locking position, the ribs 393 on the lock bar slide into the slots 385 on the hooks 383 of the latch bar 325. When the ribs 393 on the lock bar 345 are engaged with the hooks 383 on the latch bar 325 in this manner, movement of the latch bar away from the lock bar in a direction perpendicular to the front plate 307 is blocked. This also blocks the pivoting movement of the front plate 307 that is needed to disengage the latches 323 on the bottom of the front plate 307 from the anchors 335 on the bottom of the back 309 of the enclosure 305.

Accordingly, when the latches 323 and anchors 335 on the bottom of the enclosure 305 are engaged with one another in the manner illustrated in FIG. 24 and the lock bar 345 is engaged with the latch bar 325 in the manner illustrated in FIGS. 27-29, the front plate 307 is securely locked to the back of the enclosure 305. Also, when the components of the locking system 121 are engaged in this manner, the latch bar 325, including the end tabs 389 thereon, and the lock bar 345 collectively form a barrier that limits the potential for unauthorized access to the lock through the gap between the front 307 and back 309 of the enclosure 305 or through any gap associated with the opening 331 for the peripheral device 131 at the top of the enclosure 305.

To use the locking system 321 a user first places a tablet computer 103 in position within the back of the enclosure. In order to secure the front plate 307 to the back 309, the front plate is angled so the bottom of the front plate is very near the back while the top of the front plate is spaced farther away from the back. While the front plate 307 is angled this way, the latches 323 on the bottom of the front plate are hooked on the anchors 335 with the protrusions 369 on the anchors being inserted through the openings 371 in the latches. With the lock bar 345 in the non-locking position, the user then pivots the front plate 307 until the upper edge of the front plate is engaged with the upper end of the back 305 of the enclosure 305. Then the user uses the key to rotate the lock 341 and its cam 351 to move the lock bar 345 to its locking position. To unlock the enclosure 305, the process is reversed.

The Abstract and summary are provided to help the reader quickly ascertain the nature of the technical disclosure. They are submitted with the understanding that they will not be used to interpret or limit the scope or meaning of the claims. The summary is provided to introduce a selection of concepts in simplified form that are further described in the Detailed Description. The summary is not intended to identify key features or essential features of the claimed subject matter, nor is it intended to be used as an aid in determining the claimed subject matter.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

In view of the above, it will be seen that several advantages of the aspects of the invention are achieved and other advantageous results attained.

What is claimed is:

1. A system for use with a tablet computer, the system comprising:
    a plurality of peripheral devices;
    a host electronic board configured to connect the tablet computer to the plurality of peripheral devices;
    an enclosure configured to enclose the host electronic board and the tablet computer in an interior space of the enclosure, wherein the enclosure comprises a first part and a second part, the first and second parts being moveable relative to one another between an open position for adding and removing the tablet computer from the enclosure and a closed position, the enclosure being configured so the interior space of the enclosure is substantially inaccessible from outside the enclosure in the closed position; and
    a lock on the enclosure, the lock being configured to selectively convert from an unlocked configuration in which the first and second parts of the enclosure can be moved to the open position and a locked configuration in which the first and second parts of the enclosure cannot be non-destructively moved from the closed position to the open position,
    wherein the plurality of peripheral devices comprise one or more peripheral devices selected from the group consisting of a magnetic card reader, a barcode reader, barcode scanner, RF ID reader, fingerprint reader, EMV reader, EMV contactless reader, PCI contactless reader, EMV contact reader, PCI contact reader, passport reader, NFC reader, Pin reader, keypad, EMV keypad, PCI keypad, printer, and keyboard, and
    wherein the enclosure has a plurality of openings formed by at least one of the first and second parts of the enclosure, the enclosure further comprising peripheral casings substantially enclosing the peripheral devices, the peripheral casings extending through the openings and blocking access to the interior space of the enclosure through the openings.

2. A system as set forth in claim 1 wherein the host electronic board is further configured to manage power supply and battery charging for the peripheral devices.

3. A system as set forth in claim 1 wherein the host electronic board is further configured to manage all communications between the peripheral devices and the tablet computer.

4. A system as set forth in claim 1 wherein the host electronic board comprises a plurality of USB expansion ports.

5. A system as set forth in claim 1 wherein the host electronic board is configured to connect to at least some of the peripheral devices wirelessly.

6. A system as set forth in claim 1 wherein the host electronic board is configured to connect to at least some of the peripheral devices using a wired connection.

7. A system as set forth in claim 1 wherein the host electronic board is configured to supply electrical power to the tablet computer.

8. A system as set forth in claim 1 wherein the casings each comprise a physical interface that secures the casing to at least one of the first and second parts of the enclosure and positions the respective casing in the opening, the physical interfaces being substantially identical so the peripheral devices are interchangeable.

9. A system as set forth in claim 1 further comprising the tablet computer in the interior space of the enclosure.

10. A system as set forth in claim 1 wherein the plurality of peripheral devices comprise four peripheral devices selected from the group consisting of a magnetic strip reader, a barcode reader, a barcode scanner, RF ID reader, fingerprint reader, EMV reader, and an NFC reader.

11. A system as set forth in claim 9 further comprising a receiver electronic board connected to the host electronic board, the receiver electronic board comprising multiple communication ports.

12. A system as set forth in claim 11 wherein the communication port comprises at least one or the group consisting of a USB port, a serial port, an Ethernet port, and a GPIO communication port.

13. A system as set forth in claim 11 further comprising a mounting stand configured to support the enclosure, the receiver electronic board being in the mounting stand.

14. A system as set forth in claim 1 wherein the lock has an external portion outside the enclosure and an internal portion inside the enclosure and the enclosure has a joint where the first and second parts are adjacent one another, the enclosure further comprising a barrier positioned between the joint and the interior portion of the lock to block attempts to pick the lock by accessing the interior portion of the lock via the joint.

15. A system as set forth in claim 1 wherein the enclosure has an opening configured to be in registration with a touchscreen of the tablet computer when the tablet computer is in the enclosure.

16. A system as set forth in claim 1 wherein the enclosure is configured to hold the host electronic board and tablet computer in different parts of the interior space of the enclosure.

* * * * *